US007951250B2

(12) United States Patent
Farmer

(10) Patent No.: US 7,951,250 B2
(45) Date of Patent: May 31, 2011

(54) INTEGRATED FOLDING/TABBING APPARATUS FOR CREATING MAILPIECES

(75) Inventor: Geoffrey A. Farmer, Billericay (GB)

(73) Assignee: Pitney Bowes Ltd., Harlow, Essex (GB)

( * ) Notice: Subject to any disclaimer, the term of this patent is extended or adjusted under 35 U.S.C. 154(b) by 92 days.

(21) Appl. No.: 12/499,454

(22) Filed: Jul. 8, 2009

(65) Prior Publication Data

US 2010/0012253 A1 Jan. 21, 2010

(51) Int. Cl.
*B32B 41/00* (2006.01)

(52) U.S. Cl. .......... 156/64; 156/351; 156/364; 156/367; 156/368; 156/441.5; 156/442.2; 705/411

(58) Field of Classification Search .................... 156/64, 156/364, 367, 368, 351, 441.5, 442.2; 705/411
See application file for complete search history.

(56) References Cited

U.S. PATENT DOCUMENTS

| | | | | |
|---|---|---|---|---|
| 6,435,245 | B1 * | 8/2002 | Sette et al. | 156/475 |
| 2007/0085333 | A1 * | 4/2007 | Stemmle | 283/61 |
| 2007/0179665 | A1 * | 8/2007 | Welch et al. | 700/220 |

* cited by examiner

*Primary Examiner* — George R Koch, III

(74) *Attorney, Agent, or Firm* — Brian A. Collins; Charles R. Malandra, Jr; Steven J. Shapiro

(57) ABSTRACT

A method is provided for configuring a mailpiece creation system to minimize system set-up, mitigate errors and reduce the skill level required to perform tabbing operations. The method includes the steps of (i) determining a fold configuration of the sheet material employed in the creation of a mailpiece, (ii) determining the dimension of an adhesive tab for securing a free edge of the sheet material, (iii) determining a target location for the placement of each adhesive tab relative to the free edge of the folded sheet material, (iv) configuring at least one system parameter of the mailpiece creation system in accordance with at the fold configuration, adhesive tab dimension, and/or target location, and (v) executing a mail run job by the mailpiece creation system.

13 Claims, 22 Drawing Sheets

INTEGRATED FOLDING/TABBING APPARATUS FOR CREATING MAILPIECES

FIELD OF THE INVENTION

The present invention relates to folding systems and tabbing apparatus for creating mailpieces, and, more particularly, to an integrated folding and tabbing apparatus which facilitates system set-up associated with each mail run job of a mailpiece creation system.

BACKGROUND OF THE INVENTION

In the context of mailpiece delivery, a "self-mailer" is a term used to define mailpieces which employ some portion of its content information or material to form a finished mailpiece, i.e., a mailpiece ready for delivery. In addition to certain efficiencies gained from the dual use of paper stock, i.e., as both envelope and content material, self-mailers mitigate the potential for disassociation of content material from the mailing envelope, i.e., preventing mail from being delivered to an incorrect address.

One example of a self-mailer includes a sheet of content material which has been folded, e.g., a bi- or tri-fold brochure or pamphlet and sealed along a free edge such that the destination address/postage may be printed on, or applied to, a backside surface of the content material. As such, the folded sheet functions dually as both an envelope for mailing purposes and as the substrate for conveying printed content/information.

The various postal services e.g., United States Postal Service (USPS) and Royal Mail, often impose certain criteria in connection with the creation of self-mailers to ensure that the folded sheets remain secure while being handled/processed by automated postal equipment, e.g., sorters, facers, cancellers, etc. One regularly accepted and historically reliable means for securing a self-mailer include the use of adhesive tabs folded over or extending across a free edge of the folded sheets. Generally, one or two tabs are adequate to secure the folded sheets at the center, or at each end thereof, to capture the free edges.

Conventional devices or systems for creating folded self-mailers typically include a folding station, a tabbing apparatus and a conveyor/stacker. The folding station accepts one or more sheets of printed content material and folds the sheet in a bi- or tri-fold, gate-fold or Z-fold configuration. The folded sheet is then fed to the tabbing apparatus where adhesive tabs are dispensed from a carrier substrate for precise placement along at least one free edge of the folded sheet. Generally, the tabbing apparatus can be configured to perform two types of tabbing operations. In one mode of operation, the tabbing apparatus is configured to perform "edge tabbing" wherein one or more tabs are folded over an edge of the sheets, i.e., into equal halves such that half of each tab secures a folded edge of the sheet(s). In another mode of operation, the tabbing apparatus is configured to perform "surface tabbing" wherein the tab or tabs are laid flat to secure the free edge of the folded sheet(s). That is, due to the manner in which the sheets are folded, the free edge of the folded sheet(s) is not disposed along an edge of the self-mailer, but rather located at a more central location, e.g., a gate-fold. As such, the tabs are not folded over along an edge of the self-mailer, but placed and pressed flat to secure a backside surface of a folded sheet together with a free edge thereof. Whether performing edge or surface tabbing, the adhesive tab is subsequently guided into a pair of rollers where the tab is folded over the edge surfaces or pressed into engagement with the folded self-mailer. Thereafter, the finished self-mailers are fed to a conveyor/stacker and stacked for subsequent traying operations.

While these devices/systems have successfully served the needs of large volume, mail service providers, several difficulties have persisted, particularly with respect to the tabbing apparatus. For example, the rate of mailpiece creation is often limited by an inability to reliably dispense tabs as the speed of mailpiece processing equipment increases. More specifically, as speed increases, it becomes more difficult to accurately synchronize the release of each adhesive tab with a free edge of a folded sheet. Consequently, the edge or edges of each folded sheet may not be secured by equal portions of a tab. Alternatively, a tab which is inaccurately or prematurely dispensed may fall away so that the folded self-mailers are not securely tabbed.

Additionally, the carrier substrate, from which that tabs are conveyed and dispensed, can become distorted while being fed and or pulled over a "peeling blade" or "peeler bar" of the tabbing apparatus. More specifically, the carrier substrate and tabs (hereinafter referred to as the "tab stock") are fed to the peeler bar along a first feed path, wrapped around the peeler bar to effect an abrupt change in direction, and drawn away along a second feed path by a take-away mechanism. While the abrupt change in direction dispenses the tabs from the carrier substrate, it also can impose significant torque requirements on the driving motors of the tabbing head and produce high noise levels as the tab stock distorts around the peeler bar.

Other difficulties associated tabbing apparatus relate to set-up and installation of the tab stock within the tabbing head. More specifically, set-up and installation of the tab stock can be a laborious process, i.e., consuming up to ten percent (10%) of the total labor requirements to operate the tabbing head. For example, an operator must thread the tab stock through and around a plurality of pulleys, rollers and a peeler bar. Further, the operator must remove tabs which may become dislodged during set-up or installation. Moreover, the operator must initialize the position of at least a first adhesive tab to ensure that it and subsequent tabs are properly located. With respect to the latter, an operator must painstakingly locate a first tab such that equal halves of the tab and subsequent tabs will be secured to both sides of the folded sheet material. Finally, an operator must determine/identify a target location to dispense the adhesive tabs. Generally, this is an iterative process wherein an operator (i) visually inspects the sheet material to determine the position of the free edge to be secured, and (ii) performs various manual adjustments, i.e., to the conveyor speed and tab delivery speed, to establish a suitable location for dispensing the adhesive tabs.

A need therefore exists for a tabbing apparatus which reliably and accurately dispenses adhesive tabs, is reconfigurable to facilitate installation of tab stock, and reduces the time and effort associated with the initial set-up for performing tabbing operations.

SUMMARY OF THE INVENTION

A method is provided for configuring a mailpiece creation system to minimize system set-up, mitigate errors and reduce the skill level required to perform tabbing operations. The method includes the steps of (i) determining a fold configuration of the sheet material employed in the creation of a mailpiece, (ii) determining the dimension of an adhesive tab for securing a free edge of the sheet material, (iii) determining a target location for the placement of each adhesive tab relative to the free edge of the folded sheet material, (iv) configuring at least one system parameter of the mailpiece creation system in accordance with at the fold configuration, adhesive tab dimension, and/or target location, and (v) executing a mail run job by the mailpiece creation system.

BRIEF DESCRIPTION OF THE DRAWINGS

Further details of the present invention are provided in the accompanying drawings, detailed description, and claims.

DETAILED DESCRIPTION

The invention is directed to a system and apparatus for dispensing adhesively backed tabs from a carrier substrate for the purpose of securing the edges of a folded sheet material, a collation of sheets, an envelope, or a self-mailer. While the tabbing apparatus is generally employed to fabricate mailpieces, the tabbing apparatus may be used for binding the free edge(s) of any sheet material, whether or not intended for mailing.

Figure 1:
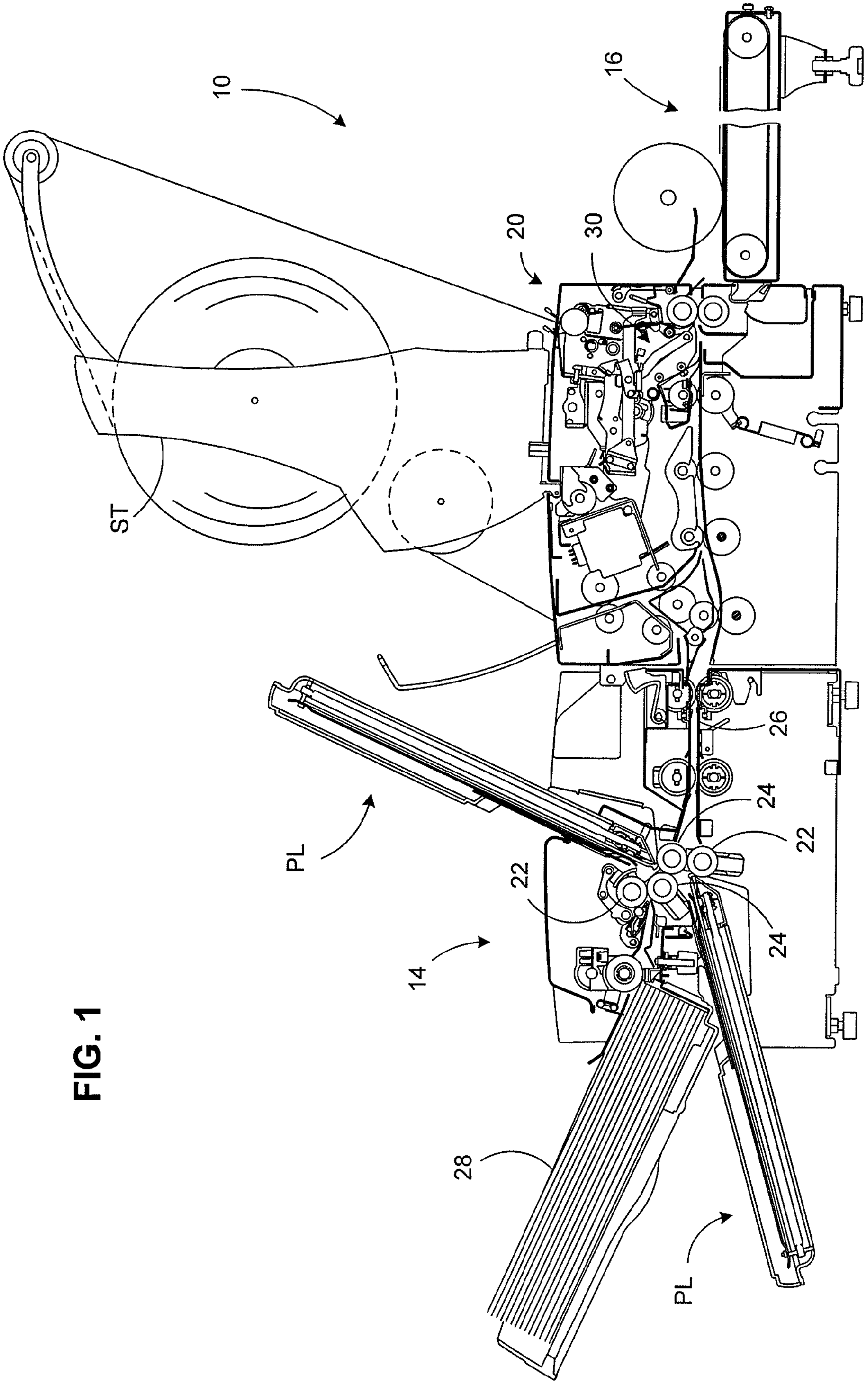
FIG. 1 is side sectional view of an apparatus including a folding station, a tabbing apparatus and a conveyor/stacker for fabricating, securing and collecting folded sheet material.

FIG. 1 depicts a mailpiece creation system 10 for fabricating, securing and collecting folded sheet material. The sheet material may include pamphlets, brochures, or other folded substrate material which require a binding tab along a free edge. The sheet material may be a single sheet or a collation of sheets which are folded/stacked and secured along a free edge. The mailpiece creation system 10 includes a folding station 14 operative to fold sheet material into a desired configuration, a conveyer/stacker 16 for collecting sheets which have been folded and secured, and a tabbing apparatus 20 disposed therebetween for tabbing a free edge or edges of the sheet material, thus securing the folded sheet material in the desired folded configuration.

The folding station 14 includes pairs of opposed rollers 22, 24 which produce folds in the sheet material as the material is redirected from one or more fold plates PL. Depending upon the number and/or operation of the opposed rollers 22, 24, any number of folds may be introduced, though, the folding apparatus 14 will generally be used to effect bi- and tri-folded sheet material. Once a desired fold configuration is achieved, the folded sheet material passes to the tabbing apparatus 20 described in greater detail below.

Figure 2:
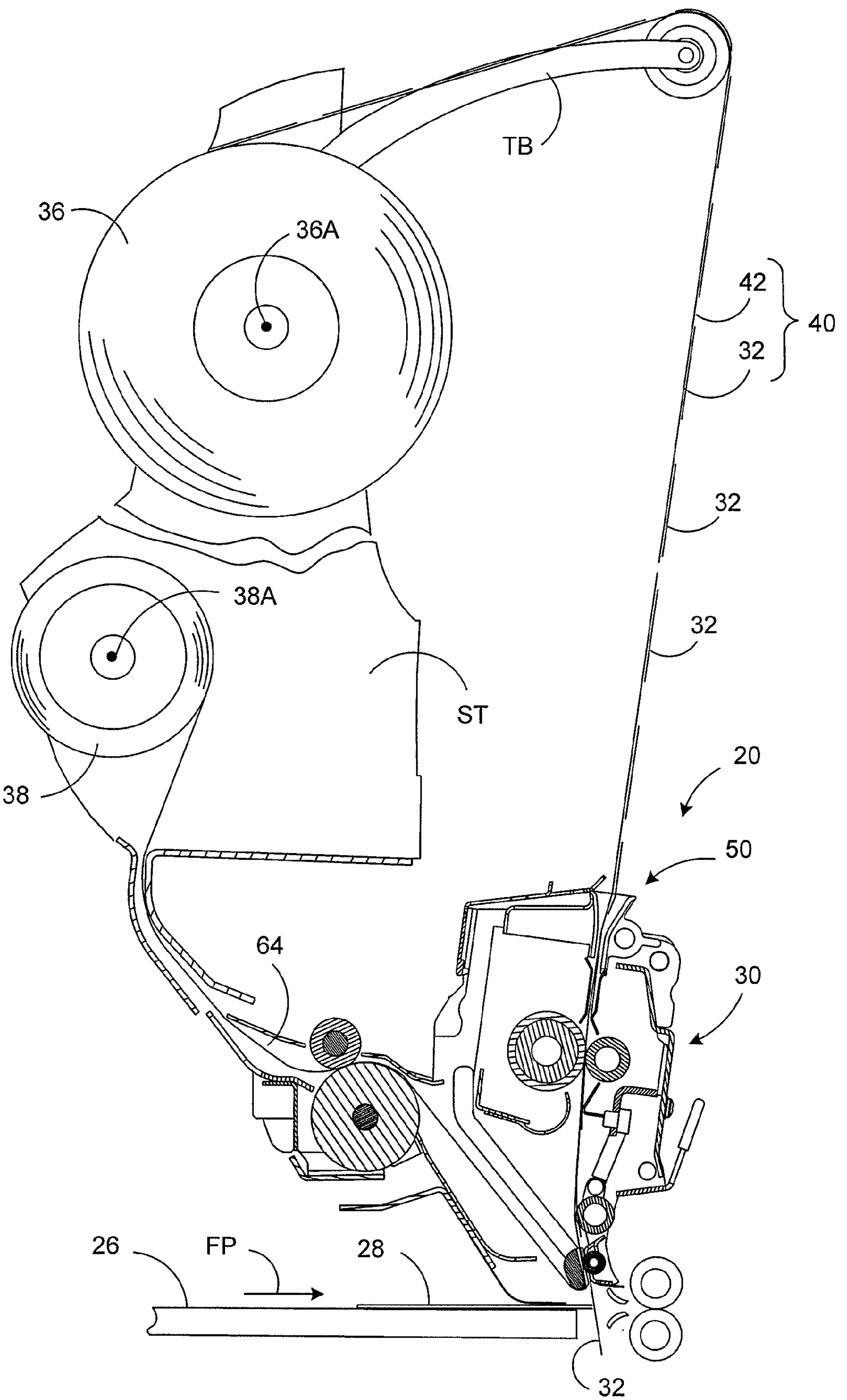
FIG. 2 is a profile view of the tabbing device including a input supply reel, an output take-away reel and a tabbing head disposed above a transport deck for conveying the folded sheet material to the tabbing head.
Figure 3:
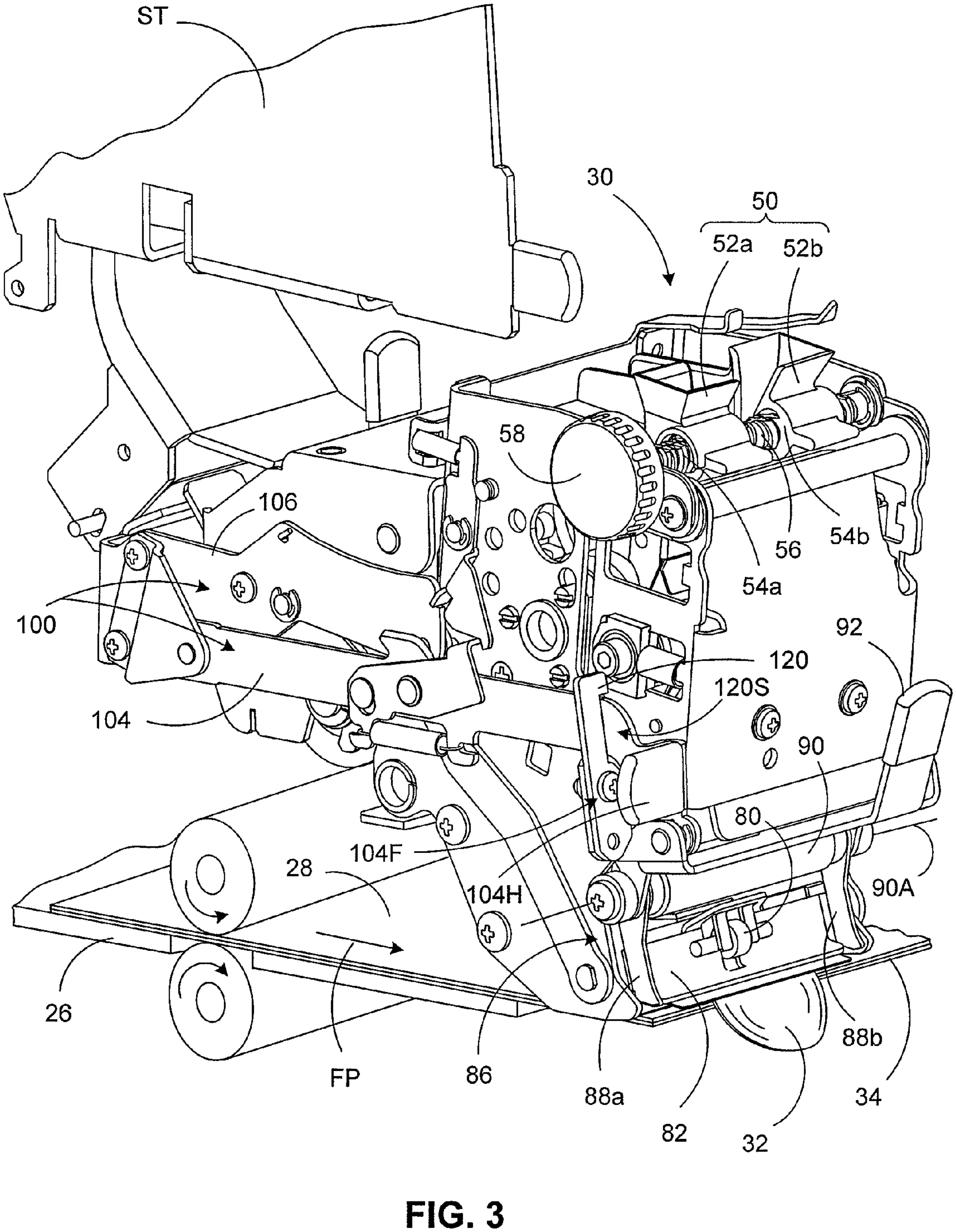
FIG. 3 is an isolated perspective view of the tabbing head according to one embodiment of the present invention wherein adhesive tabs are dispensed to secure a free edge of the folded sheet material.

In FIGS. 2 and 3, the tabbing apparatus 20 includes an input conveyor or transport deck 26 for accepting and feeding the folded sheet material 28 beneath a tabbing head 30 which is generally disposed above the input conveyor 26. For the purposes of clarity, a single tabbing head 30 is shown dispensing an adhesive tab 32 along a free edge 34 (best seen in FIG. 3) of the sheet material 28. Oftentimes, however, a pair of tabbing heads are disposed side-by-side to apply a pair of adhesive tabs along the free edge, i.e., proximal to each of side edge of the sheet material. Further, such dual tabbing heads are typically moveable along the length of the free edge 34 to allow variable spacing between the adhesive tabs 32.

The tabbing apparatus 20 also includes an input reel 36 (see FIG. 2) operative to supply tab stock 40 to the tabbing head 30, and an output reel 38 operative to take-away a carrier substrate 42 from the tabbing head 30. In the context used herein "tab stock" means any strip comprising at least one aligned row of adhesively-backed tabs 32 disposed on the carrier substrate 42. The strip of tab stock 40 may take the form of a web which is rolled or folded so as to form a plurality of elongate strips in a continuous Z-shaped stack. Generally, the adhesive tabs 32 are equally-spaced on the carrier substrate 42, circular in shape, and between about one-half inches (½") to about one and one-quarter inches (1¼") in diameter. Further, the carrier substrate 42 is often fabricated to produce a non-stick surface on the side containing the adhesive tabs 32 to facilitate the delivery of the tabs 32.

In the described embodiment, the input supply and output take-away reels 36, 38, are commonly supported by a vertical tower ST about axes 36A, 38A which are substantially orthogonal to the feed path FP of the folded sheet material 28. Further, the supply and take-away reels 36, 38 are disposed in a common plane, i.e., on the same side of the vertical support tower ST. Moreover the reels 36, 38 are spaced-apart such that, as the input supply reel 36 dispenses tab stock 40 and the output take-away reel 38 collects the carrier substrate 42 (sometimes referred to as "waste material"), the respective diameters of each are accommodated within a minimum space envelope. The vertical support tower ST may also include sensors (not shown) to detect when one of the reels 36, 38 is empty or full.

Additionally, a spring-biased tensioning bar TB (see FIG. 2) extends outwardly from and beyond the maximum diameter of the input supply reel 36, i.e., when fully loaded, such that the tab stock 40 extends outwardly and around the tensioning bar TB when dispensing and supplying tab stock 40 to the tabbing head 30. As will be discussed in greater detail below, the magnitude of tension applied to the tab stock 40, i.e., the carrier substrate 42 is critical to the accurate and reliable delivery of adhesive tabs 32.

The following discussion will be organized to initially describe the tabbing head 30 and the various internal elements which are operative to dispense adhesive tabs 32 from the carrier substrate 42. Subsequently, a description of other mechanisms and assemblies is provided relating to a mechanism/assembly for reconfiguring the tabbing head 30 to facilitate set-up and loading of the tab stock 40 therein. Thereafter, a feedback sensing system is described which is operative to statically and dynamically reposition the tab stock 40 within the tabbing head 30 to accurately and reliably dispense adhesive tabs 32. Finally, a method and system is provided to facilitate set-up and installation by integrating various functions of both the folding station 14 and tabbing apparatus 20.

Tabbing Head Assembly and Operation

Figure 4:
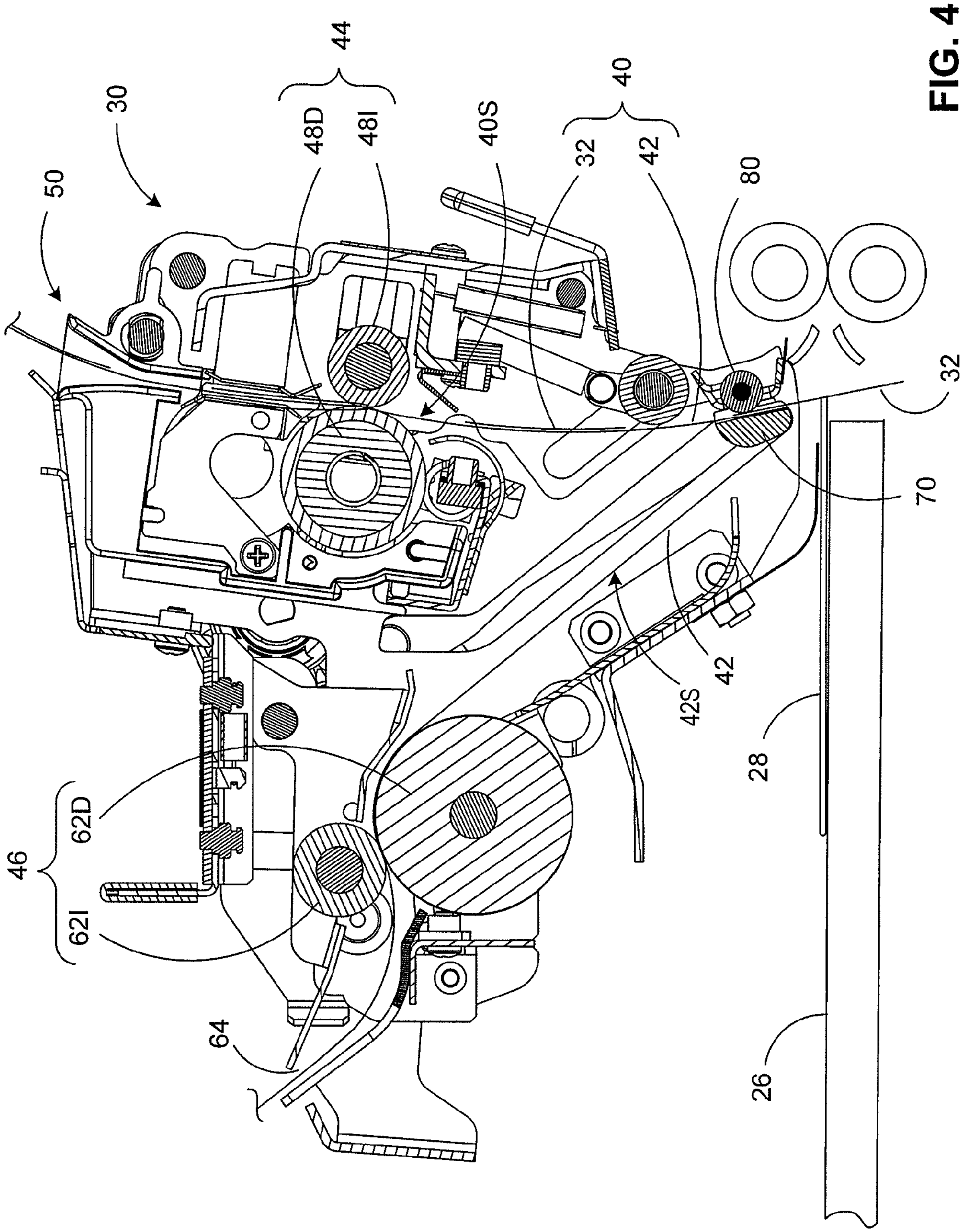
FIG. 4 is a side sectional view of the tabbing head including an input mechanism for feeding an input stream of tab stock, an output mechanism for taking away an output stream of carrier substrate and a peeler bar interposed therebetween to abruptly change the direction of the input and output streams and separate/dispense the adhesive tabs from the carrier substrate.
Figure 5:
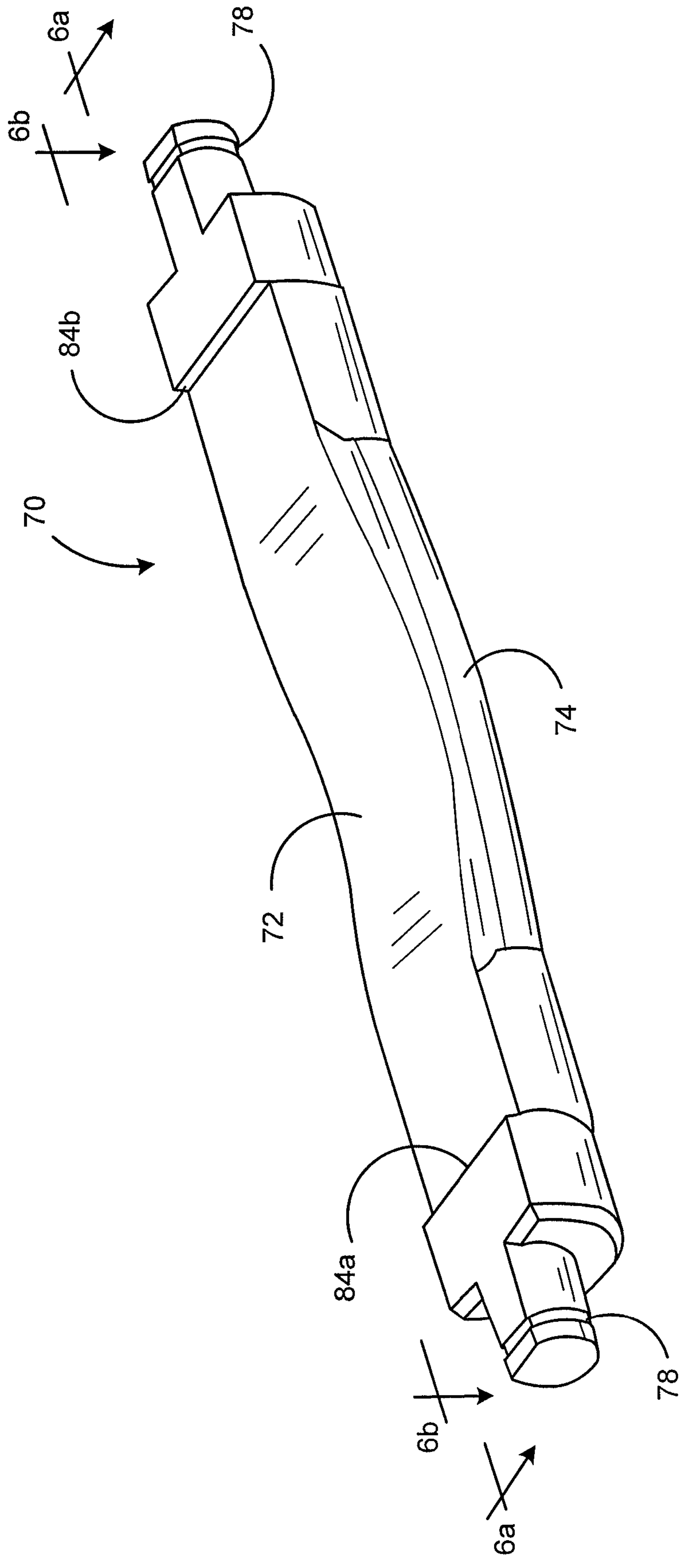
FIG. 5 is an isolated perspective view of the peeler bar according the present invention.

In FIGS. 2, 3 and 4, the tabbing head 30 comprises a feeder or input mechanism 44 operative to convey an input stream 40S of tab stock 40, an exit or output mechanism 46 operative to take-way an output stream 42S of carrier substrate 42 and a peeler bar 70 interposed between the input and output streams 32S, 42S for dispensing the adhesive tabs 32 from the carrier substrate 42. More specifically, the feeder mechanism 44 may include a pair of input rollers i.e., a drive roller 48D and an idler roller 481, adapted to receive a supply of tab stock 32 from the input supply reel 36 through a laterally adjustable guide chute 50. The guide chute 50 is bifurcated to form two guide elements 52*a*, 52*b* (see FIG. 3) each having a threaded aperture 54*a*, 54*b* for accepting a threaded rod or shaft 56. The threaded rod 56 and respective threaded apertures 54*a*, 54*b* of the guide elements 52*a*, 52*b* include right and left hand threads 56*a*, 56*b* such that rotation of the rod 56 in one direction draws the guide elements 52*a*, 52*b* together while rotation in the opposite direction causes guide elements 52*a*, 52*b* to move apart. A knob 58 (see FIG. 3) mounts to an end of the threaded rod 56 to facilitate rotation thereof and adjustment of the guide elements 52*a*, 52*b*.

From the guide chute 50, the tab stock 40 passes through a nip produced by the drive and idler rollers 48D, 481 of the feeder mechanism 44 and the input stream 40S of tab stock 40 extends downwardly toward the peeler bar 70. The input stream 40S slideably engages and wraps around several uniquely contoured surfaces of the peeler bar 70, discussed in greater detail below, to separate and dispense the adhesive tabs 32 from the carrier substrate 42. In terms of a broad functional description, the peeler bar 70 effects an abrupt change in direction with respect to the input and output streams 40S, 42S e.g., a directional change exceeding about seventy-five degrees (75°), such that the adhesive tabs 32 separate from the carrier substrate 42 and are dispensed along the free edge of the folded sheet material 28. The output stream 42S of carrier substrate 42 then passes from the backside surface of the peeler bar 70 through a nip produced by the drive and idler rollers 62D, 62I of the output mechanism 46. Thereafter the carrier substrate 42 extends upwardly and outwardly through an exit channel 64. Finally, the output take-away reel 38 collects the carrier substrate 42 or waste material from the exit channel 64.

In FIGS. 4, 5, 6, and 7, the peeler bar 70 includes a unique surface contour to facilitate the delivery of adhesive tabs 32, to minimize the torque/tensile loads required to pull the tab stock 40 over and around the peeler bar 70, and to favorably position the adhesive tabs 32 for reliable and accurate placement. More specifically, the peeler bar 70 includes first and second peripheral surfaces 72, 74 (see FIGS. 5 and 6) which interpose the input and output streams 40S, 42S, such that the underside surface of the carrier substrate 42 slideably engages the peripheral surfaces 72, 74. In one embodiment of the invention, the first peripheral surface 72 defines an arcuate shape along an elongate axis 70A of the peeler bar 70. Furthermore, the arcuate surface preferably defines a concave curvature wherein (i) a line LPA (see the top view of FIG. 6) parallel to the elongate axis 70A intersects the surface 72 at two points P1, P2, and (ii) a line LPE (see the sectional view shown in FIG. 7) perpendicular to the elongate axis 70A is substantially parallel to the surface 72 along at least a portion thereof.

The second peripheral surface 74 is substantially orthogonal with respect to the first peripheral surface 72 so as to effect an abrupt directional change with respect to the input and output streams 40S, 42S. In the context used herein "substantially orthogonal" means that the first and second peripheral surfaces 72, 74 define an angle θ of (see FIG. 7) between seventy-five degrees (75°) to about one-hundred and five degrees (105°) with a mean value of about ninety degrees (90°). While in one embodiment of the invention, the second peripheral surface 74 may define a substantially linear shape with respect to the elongate axis 70A, in another embodiment of the invention, the second peripheral surface may also define an arcuate shape. In this embodiment, the arcuate shape preferably defines a convex curvature wherein a line LPT (see the perspective along line 6*b* of FIG. 6) of parallel to the elongate axis 70A defines a point of tangency TP. That is, the line LPT intersecting the tangency point TP on the surface 74 will intersect that point TP and no other. Consequently, the first and second peripheral surfaces 72, 74 each define an arcuate surface, however one surface is concave while the other is convex.

In addition to the similar, yet different arcuate shapes, in another embodiment of the invention (shown in FIG. 6), the radius of curvature may also vary from one peripheral surface 72 to the other surface 74. More specifically, in this embodiment, the radius of curvature RC1 of the first peripheral surface 72 is greater than the radius of curvature RC2 of the second peripheral surface. In the preferred embodiment, the radius of curvature RCI may be about ten percent (10%) to thirty percent (30%) larger than the radius of curvature RC2.

Figure 8:
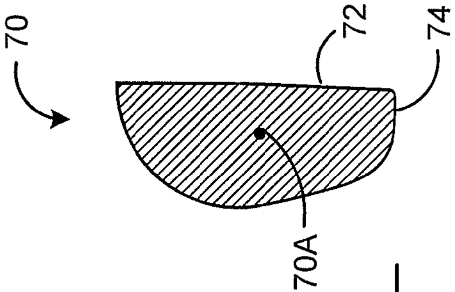
FIG. 8 is a sectional view taken substantially along line 8-8 of FIG. 6 illustrating the surface contour of the peeler bar along the elongate axis and at a first location between the center and an end portion thereof.
Figure 9:
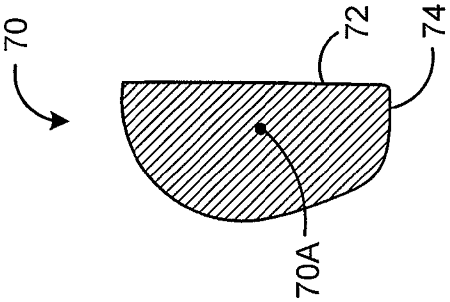
FIG. 9 is a sectional view taken substantially along line 9-9 of FIG. 6 illustrating the surface contour of the peeler bar along the elongate axis and at a second location between the center and an end portion thereof.
Figure 10:
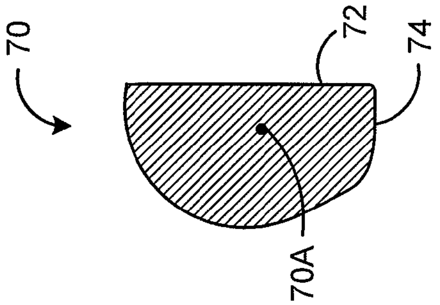
FIG. 10 is a sectional view taken substantially along line 10-10 of FIG. 6 illustrating the surface contour of the peeler bar along the elongate axis and at a third location between the center and an end portion thereof.

To obtain a more complete view of the peeler bar 70 and its surface contour of the first and second peripheral surfaces 72, 74, FIGS. 7 through 11 show detailed cross sectional views of the peeler bar 70 along its elongate axis 70A. FIGS. 8, 9 and 10 show several cross-sectional views disposed between the center cross-section of FIG. 7 and an end section shown in FIG. 11. Furthermore, the contours of the first and second peripheral surfaces 72, 74 are substantially symmetric with respect to the center cross-sectional view shown in FIG. 7.

Figure 6:
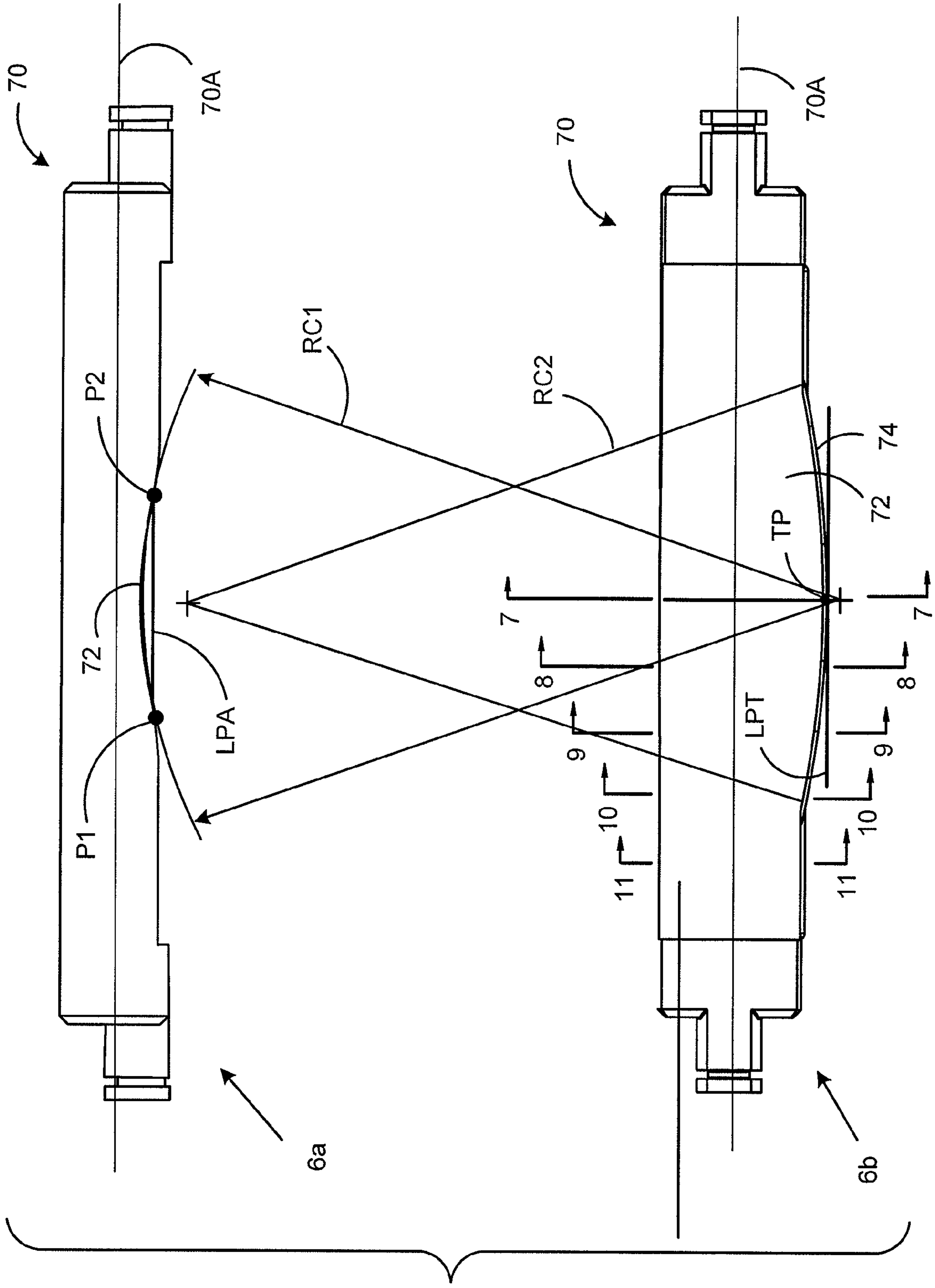
FIG. 6 depicts top and profile illustrations of the peeler bar as viewed along lines 6*a* and 6*b*, respectively, of FIG. 5.
Figure 7:
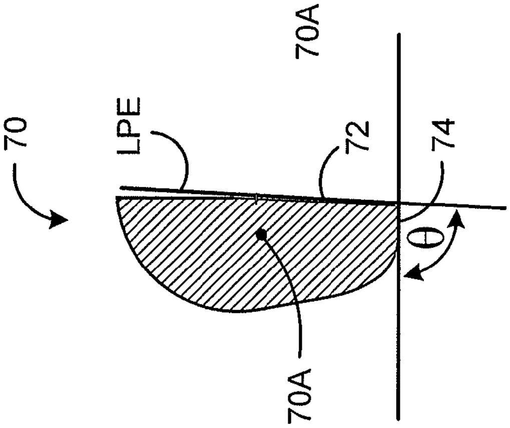
FIG. 7 is a sectional view taken substantially along line 7-7 of FIG. 6 illustrating the surface contour of the peeler bar through the center thereof.
Figure 12:
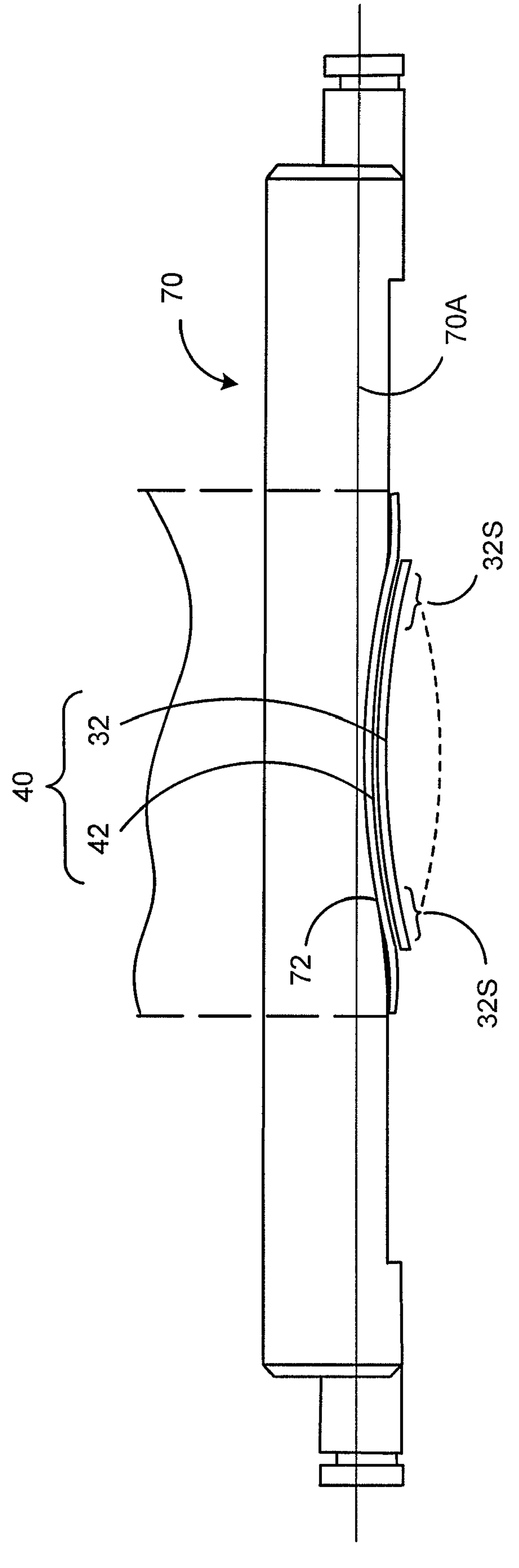
FIG. 12 is a top view of the peeler bar including a section of tab stock slideably engaging a first peripheral surface of the peeler bar.

In operation and referring the FIGS. 4, 6, and 12 the carrier substrate 42 is pulled across the first and second peripheral surfaces 72, 74 to dispense adhesive tabs 32 from the carrier substrate. As the tab stock 40 is drawn across the first peripheral surface 72 of the peeler bar 70, a concave curvature is induced in both the carrier substrate 42 and adhesive tabs 32. As a result, the bending stiffness of the adhesive tabs 32 about an axis parallel to the elongate axis 70A of the peeler bar 70 is increased. The increased bending stiffness augments the rigidity of the tab 32 and increases the maximum allowable bending stress of the tab 32. Further, the tensile forces imposed by the adhesive on the tab 32 are lower relative to the bending stress required to bend the tab 32 around the peeler bar 70 i.e., with the carrier substrate 42. Consequently, the leading edge of the adhesive tab 32 consistently and reliably separates from the carrier material 32 as the tab stock 40 charges direction, i.e., as the tab stock 40 is drawn across the first and second peripheral surfaces 72, 74 of the peeler bar 70.

Figure 13:
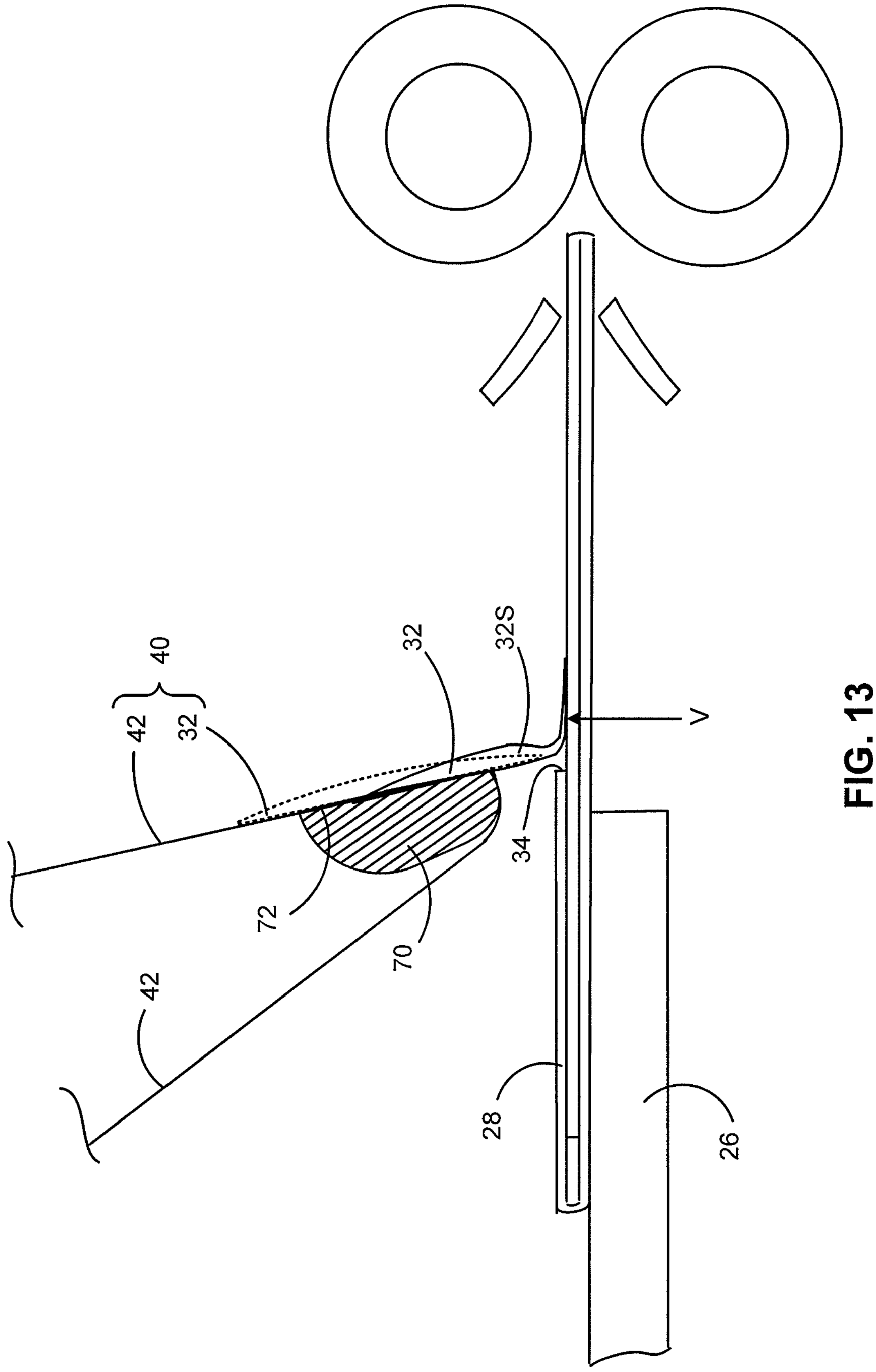
FIG. 13 is a side view of an adhesive tab being dispensed by the peeler bar when performing surface tabbing operations.

Furthermore, the concave curvature induced by the first peripheral surface 72 favorably positions the adhesive tab 32 for both edge and surface tabbing. As previously mentioned in the Background of the Invention, prior art tabbing apparatus are generally limited to performing only one type of tabbing operation, i.e., tabbing apparatus designed for edge tabbing cannot reliably perform surface tabbing and visa-versa. In contrast, and referring to FIGS. 12 and 13, the peeler bar 70 of the present invention reliably performs both edge and surface tabbing operations by inducing a curvature which (i) adds stiffness in one direction to facilitate tab separation to facilitate edge tabbing, and (ii) promotes bending in the feed direction of folded sheet material to facilitate surface tabbing. With respect to surface tabbing, a vertical load V is applied to the leading edge of a tab 32 as the tab 32 is dispensed vertically downward. As such, the arcuate outboard segments 32S are placed in compression. Inasmuch as these segments 32S are weak in compression, they tend to buckle at points BK1, BK2 and cause the tab 32 to bend into the concave portion of the tab 32. Hence, by applying a concave curvature to the adhesive tab 32, the tab 32 will reliably bend and lay flat for surface tabbing. While the this operation can be performed reliably even when the folded sheet material is not in motion, surface tabbing is facilitated further when laying the arcuate tab 32 on a sheet material 28 which is conveyed in a direction which complements the bending/buckling of the tab 32. That is, a surface tabbing is facilitated when the folded sheet material 28 initially arrives at the center of the convex surface and subsequently travels toward the arcuate segments 32S the tab.

Figure 11:
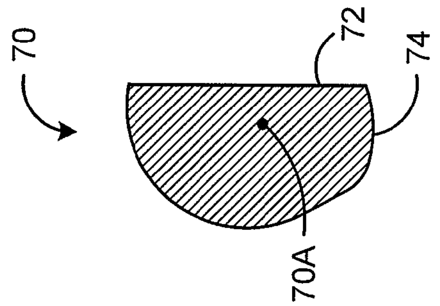
FIG. 11 is a sectional view taken substantially along line 11-11 of FIG. 6 illustrating the surface contour of the peeler bar through an end region thereof.

In as much as the concave curvature of the first peripheral surface 72 essentially removes material from a central region thereof, it came to be understood that the carrier substrate 42 may travel an unequal length around the peripheral surfaces of the peeler bar. As a consequence, transverse buckling/wrinkling of the tab stock 40 may occur which can (i) dramatically increase the torque requirements of the tabbing head motor, i.e., the motor responsible for pulling the carrier substrate 42 around the peeler bar 70, and (ii) increase the noise/acoustics of the tabbing apparatus 20. To mitigate these potential difficulties, additional surface length is produced by the convex curvature of the second peripheral surface 74. As a result, the carrier substrate 42 essentially travels the same length at each cross-section of the peeler bar 70 (the sections depicted in FIGS. 7 though 11). This is most apparent when examining and comparing the cross-section at the center of the peeler bar 70 (FIG. 7) with the cross-section at the end region (FIG. 11).

In addition to equalizing the length of travel, the convex curvature of the second peripheral surface 74 (see FIG. 6) functions to guide and retain the tab stock 40 about the center of the peeler bar 70. The inventors discovered that by decreasing the radius of curvature RC2 of the second peripheral surface 74, additional guidance/centering of the carrier substrate 42 is attained. It was also determined that, when optimizing the various requirements discussed above, it was most advantageous to maintain a first radius of curvature RC1 associated with the first peripheral surface 72 while decreasing the radius of curvature RC2 associated with the second peripheral surface 74. That is, even though the surface length of the peripheral surfaces 72, 74 from section to section vary slightly as a result of differences in the radii of curvature RC1, RC2, the benefit with respect to lateral centering of the tab stock 40 was warranted In yet another embodiment of the invention, and referring again to FIGS. 3, 4, and 5, a corrugating roller 80 is may be disposed in opposed relation to the peeler bar 70 before the tab stock 40 contacts the first peripheral surface 72 of the peeler bar 70. Functionally, the corrugating roller 80 biases the curvature of the tab stock 40 to complement the concave curvature of the first peripheral surface 72. In the described embodiment, the corrugating roller 80 is supported by and rotationally mounted to a transverse guide bar 82 which is centered by and between shoulders 84*a*, 84*b* formed at each end of the peeler bar 70. The guide bar 82 may be attached at each end to a spring biased mounting assembly 86 having a pair of connecting arms 88*a*, 88*b* which are pivotable about a shaft 90 having an axis 90A. A lever 92 is affixed to the shaft 90 such that the mounting assembly 86 may pivot about axis 90A to move the corrugating roller 80 away from the peeler bar 70 during set-up or to facilitate jam access.

Thus far the tabbing apparatus 20 has been described in terms of the various internal elements of the tabbing head 30 which are operative to dispense adhesive tabs 32 from the carrier substrate 42. The following description relates to a mechanism/assembly for reconfiguring the tabbing head 30 to facilitate set-up and loading of the tab stock 40.

Reconfigurable Tabbinq Apparatus

As discussed previously and referring to FIGS. 14*a* and 14*b*, the tabbing head 30 includes an input mechanism 44 including a pair of rollers, 48D, 48I and an output mechanism including a pair of rollers 62D, 62I. A motor (not shown) drives each of the drive rollers 48D, 62D of each of the input and output mechanisms 44, 46 such that each may be independently driven. However, the input mechanism 44 includes an overrunning clutch (not shown) and may be driven by the output mechanism 46 inasmuch as the input and output mechanisms 44, 46 are connected and synchronized by a series of spur gears (not shown) disposed therebetween. Hence, the drive rollers 48D, 62D of each of the mechanisms 44, 46 may be driven independently, however, the input drive roller 48D may be driven be the output or exit drive roller 62D through a gear train assembly.

The tabbing head 30 also includes several mechanisms and assemblies therein which facilitate loading of the tab stock without the complexities and time associated with stripping adhesive tabs 32 from the carrier substrate 42 and feeding the tab stock though the internal mechanisms, guides and channels of the tabbing head 30. More specifically, and referring to FIGS. 14*a*-16*b*, the tabbing head 30 includes a displacement mechanism 100 (see FIGS. 14*b*, 15*b* and 16*b*) for repositioning the peeler bar 70 from a loading position (see FIG. 14*a*) to a dispensing position (see FIG. 15*a*). In the loading position, the displacement mechanism 100 is operative to disengage the peeler bar 70 from the stream of tab stock 40 to facilitate loading from the input to the output mechanisms 44, 46. In the dispensing position (FIG. 15*a*), the displacement mechanism 100 is operative to engage peeler bar 70 with the stream of tab stock 40 to dispense tabs 32 from the carrier substrate 42.

In the described embodiment, the displacement mechanism 100 is manually actuated by an operator, though the mechanism 100 may be electrically actuated by a rotary or linear actuation device. The displacement mechanism 100 includes a means 102 (see FIGS. 14*a*, 15*a*, and 16*a*) for guiding the peeler bar 70 from the loading or disengaged position to the dispensing or engaged position, a load lever 104, a spring-biased actuating crank 106, a pair of first connecting links 108, and a locking/release assembly 110. The guide means 102 includes a pair of slots 112 (only one of the slots 112 being shown in the Figures) for engaging circumferential grooves 78 (see FIG. 5) disposed at each end of the peeler bar 70. The slots 112 are disposed on both sides of the tabbing head housing 114, extend vertically downward, and are inclined forwardly (from top to bottom) to guide the peeler bar 70 across an installation feed path IFP disposed between the input and output mechanisms 44, 46. When located at an upper end 112U of the slots 112, the peeler bar 70 is disposed on a first side of the installation feed path IFP, i.e., in the loading position and when positioned at a lower end 112L, the peeler bar 70 engages the tab stock 40 to dispense adhesive tabs 32, i.e., in the dispensing position. The installation feed path IFP is also defined by a retractable guide member 116 which facilitates loading of the tab stock 40 from the input to output mechanisms 44, 46. The installation guide path IFP and retractable guide member 116 (FIGS. 14*a*, 15*a*, 16*a*) be discussed in greater detail when discussing the set-up and loading of the tab stock 40 internally of the tabbing head 30.

The various linkages of the displacement mechanism 100 act on both sides of the peeler bar 70 and may include: (i) a yoke structure spanning the width of the tabbing head 30, (ii) a pair of identical links disposed on each side of the housing 114, or (iii) a single link actuating another link having a pair of actuating arms. In the described embodiment, the load lever 104 is disposed in a substantially horizontal orientation and supported at one end by a guide fork 120 having slot 120S (see FIG. 3) therein for permitting a substantially linear push-pull displacement. The load lever 104, furthermore, includes a handle portion 104H at a forward end 104F of the link 104 to facilitate operator input.

Figure 14B:
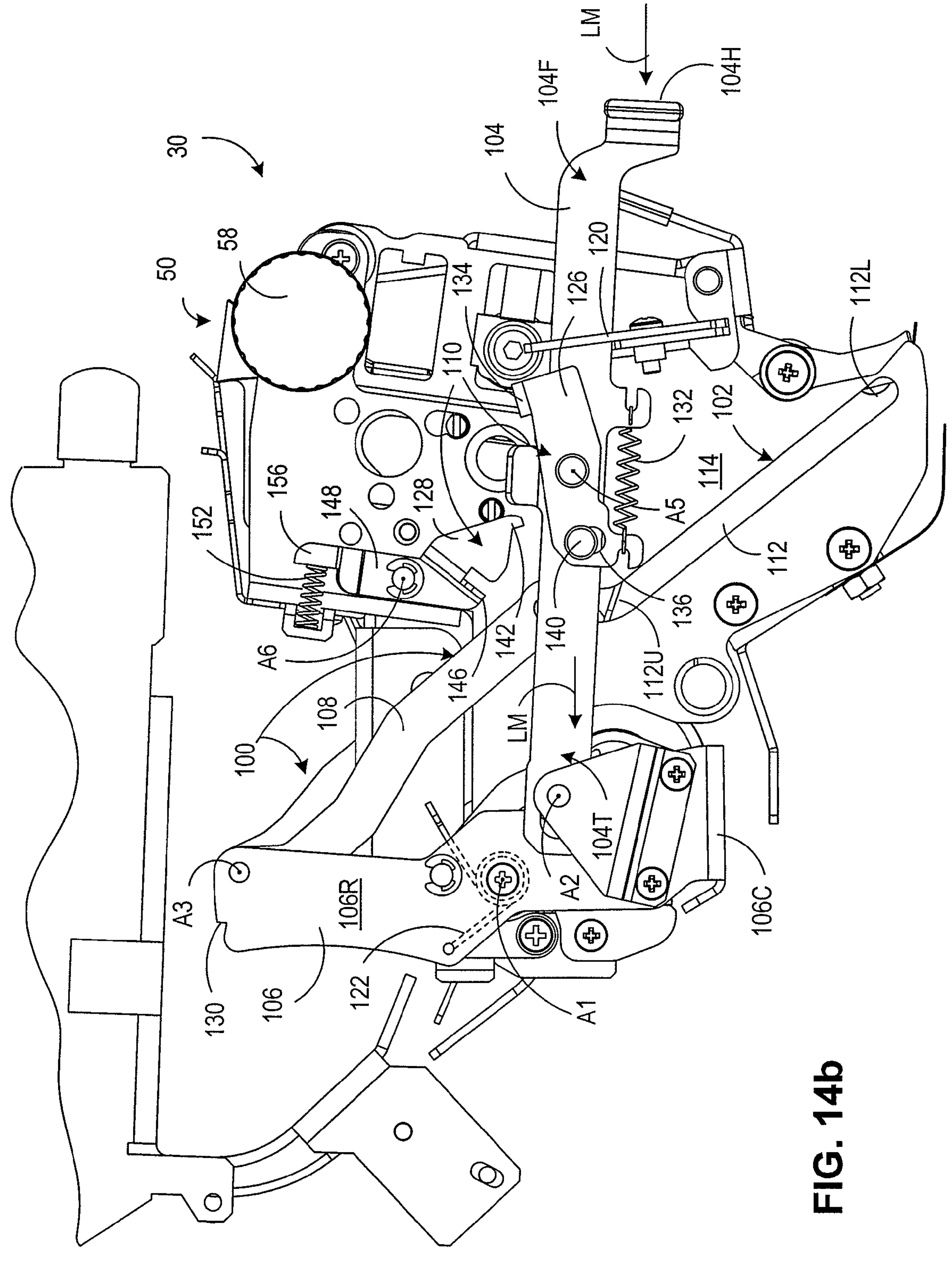
FIG. 14*b* is a profile view of the tabbing head depicting a displacement mechanism in the loading position for repositioning the peeler bar within a pair of guide slots.
Figure 15A:
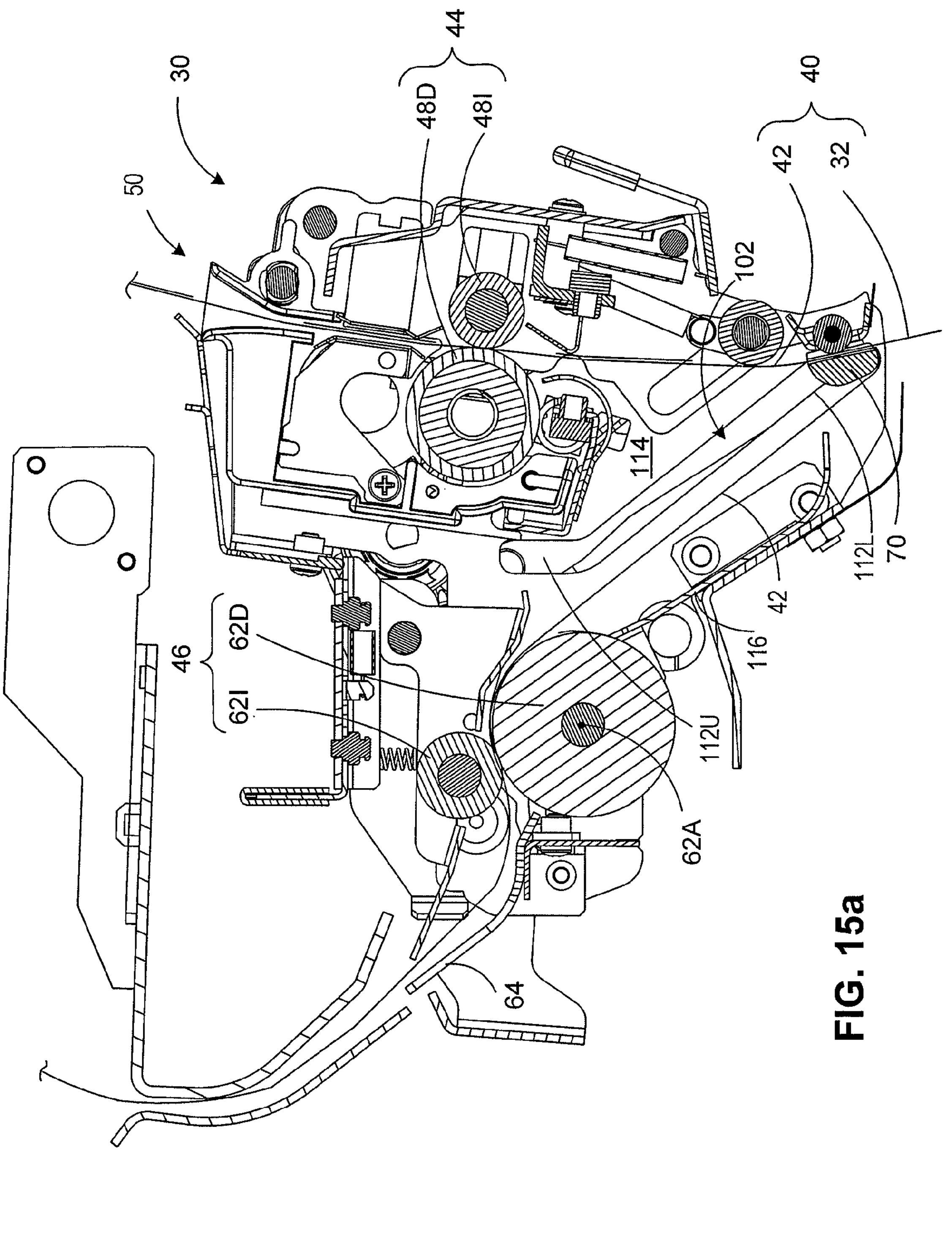
FIG. 15*a* is a side sectional view of the tabbing head depicting the dispensing position of the peeler bar and revealing the feed path of the tab stock as it dispenses adhesive tabs.
Figure 15B:
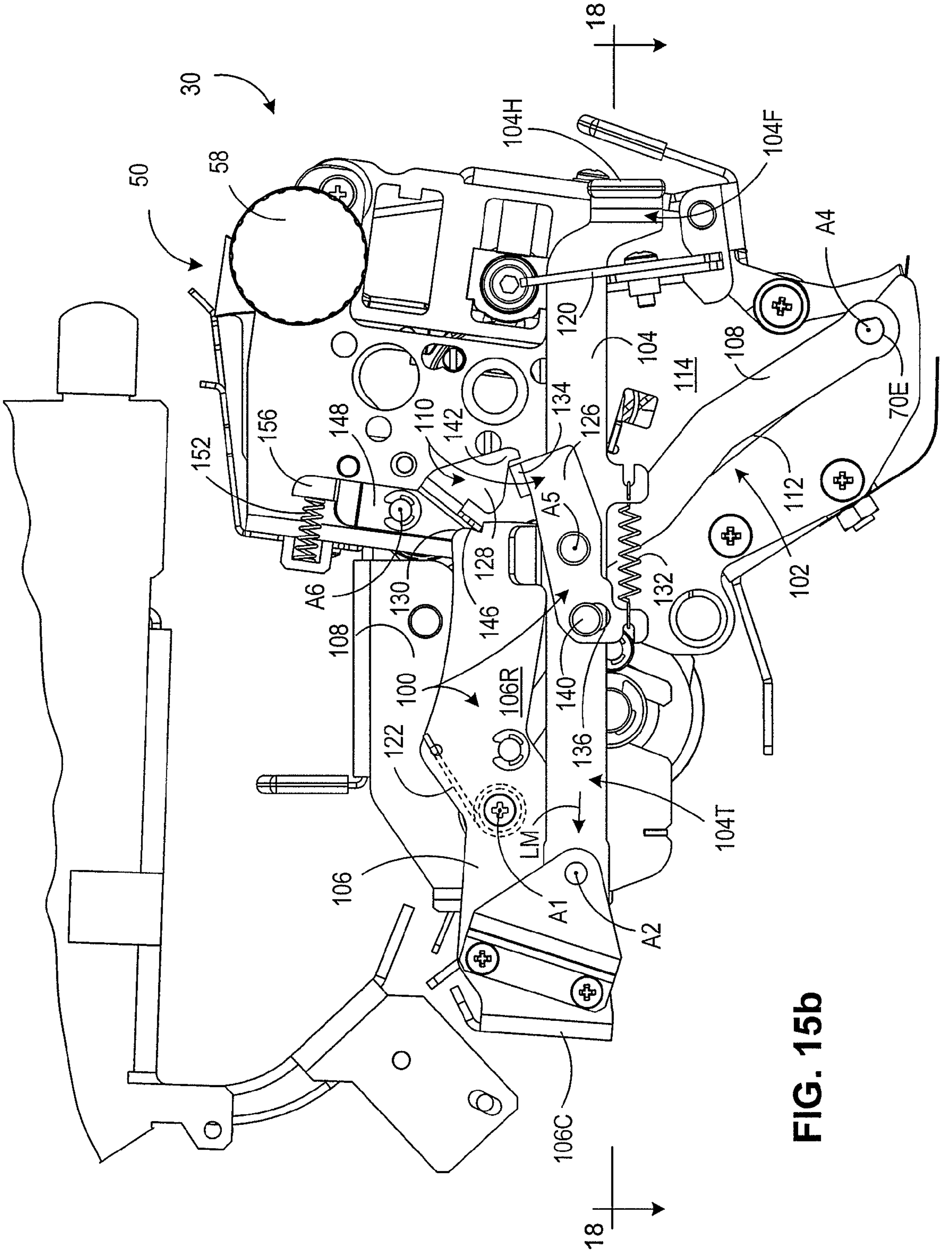
FIG. 15*b* is a profile view of the tabbing head depicting the displacement mechanism in the dispensing position.
Figure 16A:
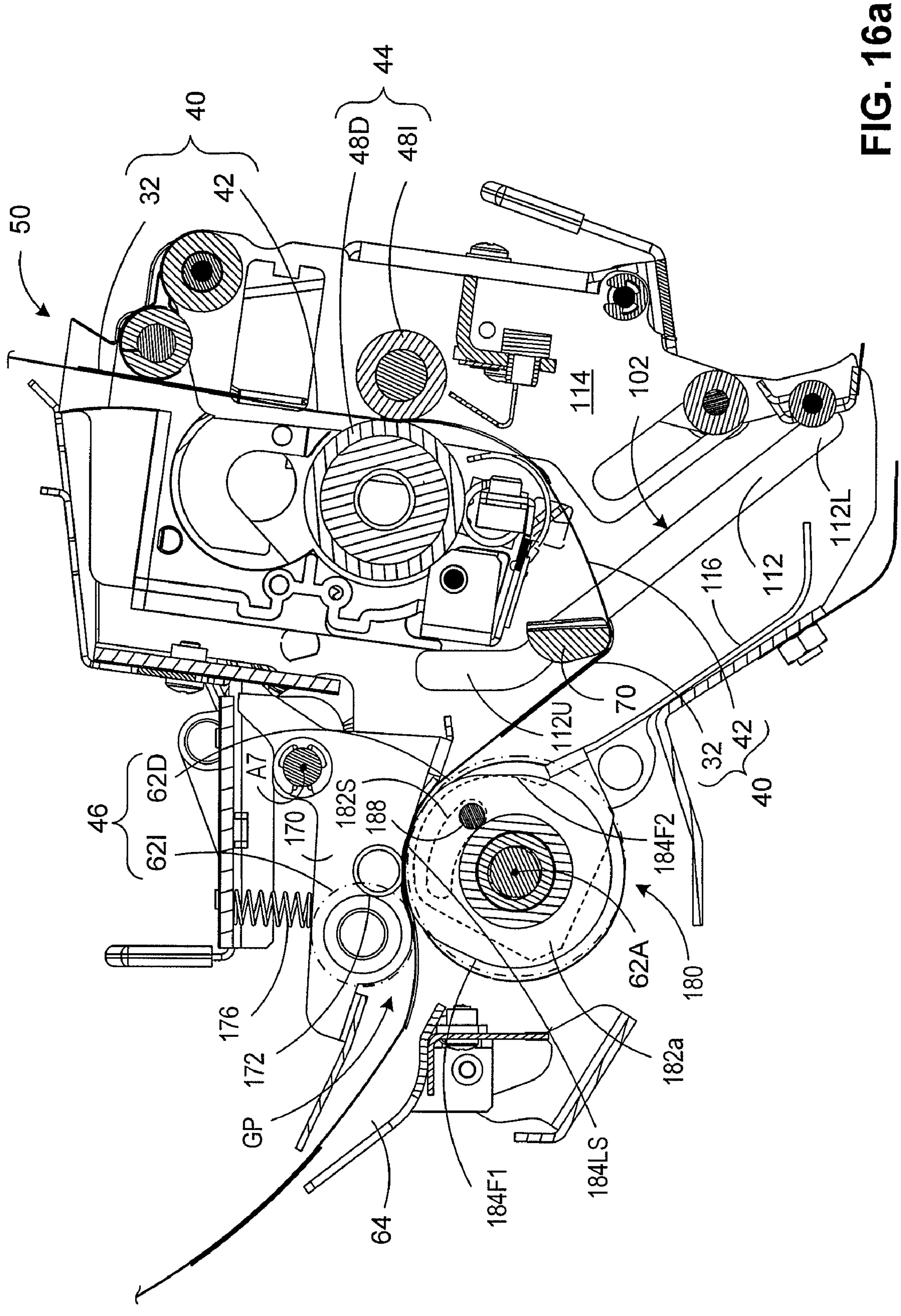
FIG. 16*a* is a side sectional view of the tabbing head depicting an intermediate position of the peeler bar and showing an additional length of the tab stock being drawn back from the output reel by the downward motion of the peeler bar.
Figure 16B:
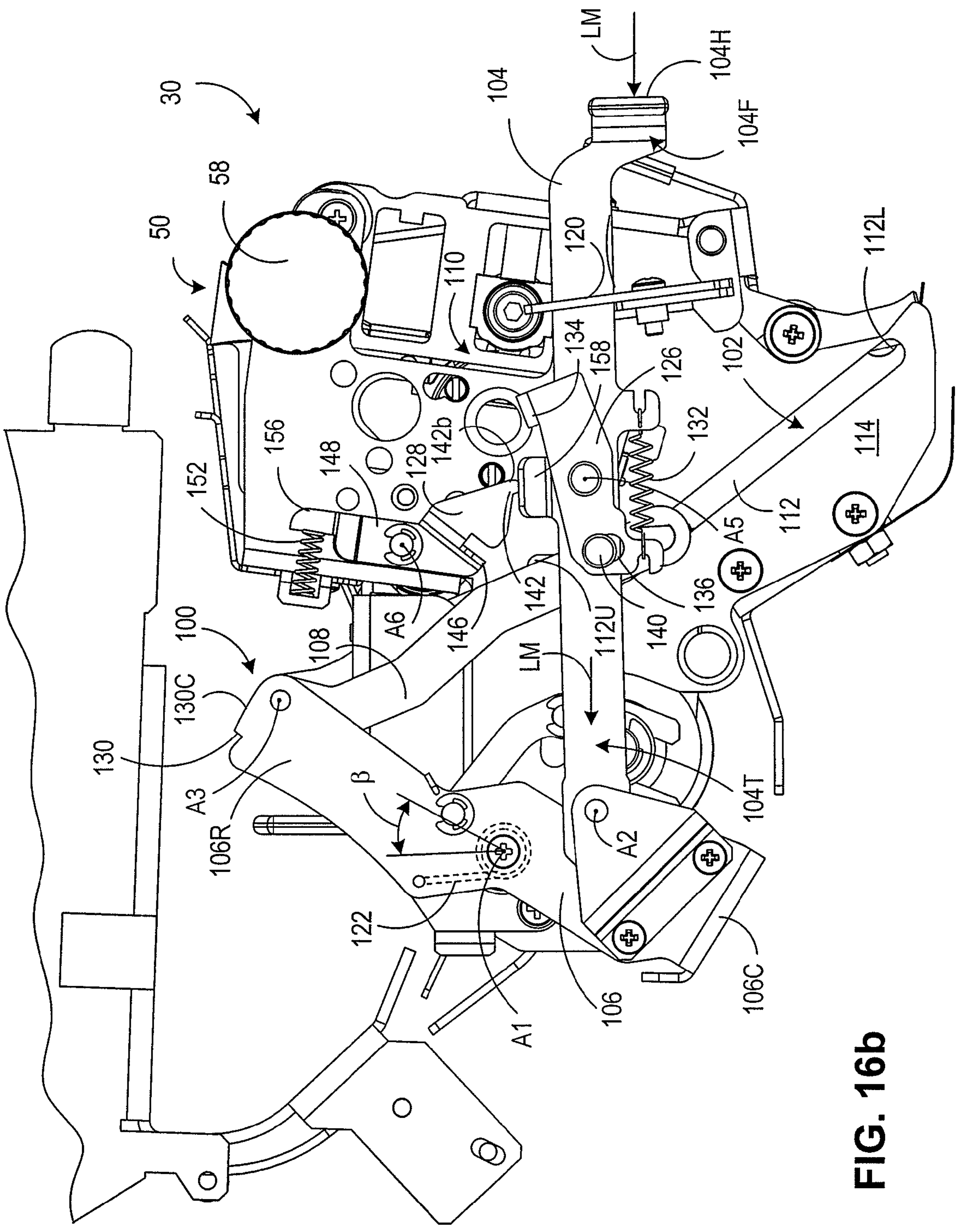
FIG. 16*b* is a profile view of the tabbing head depicting a displacement mechanism in an intermediate position showing the motion of the peeler bar from the loading to dispensing positions.
Figure 17:
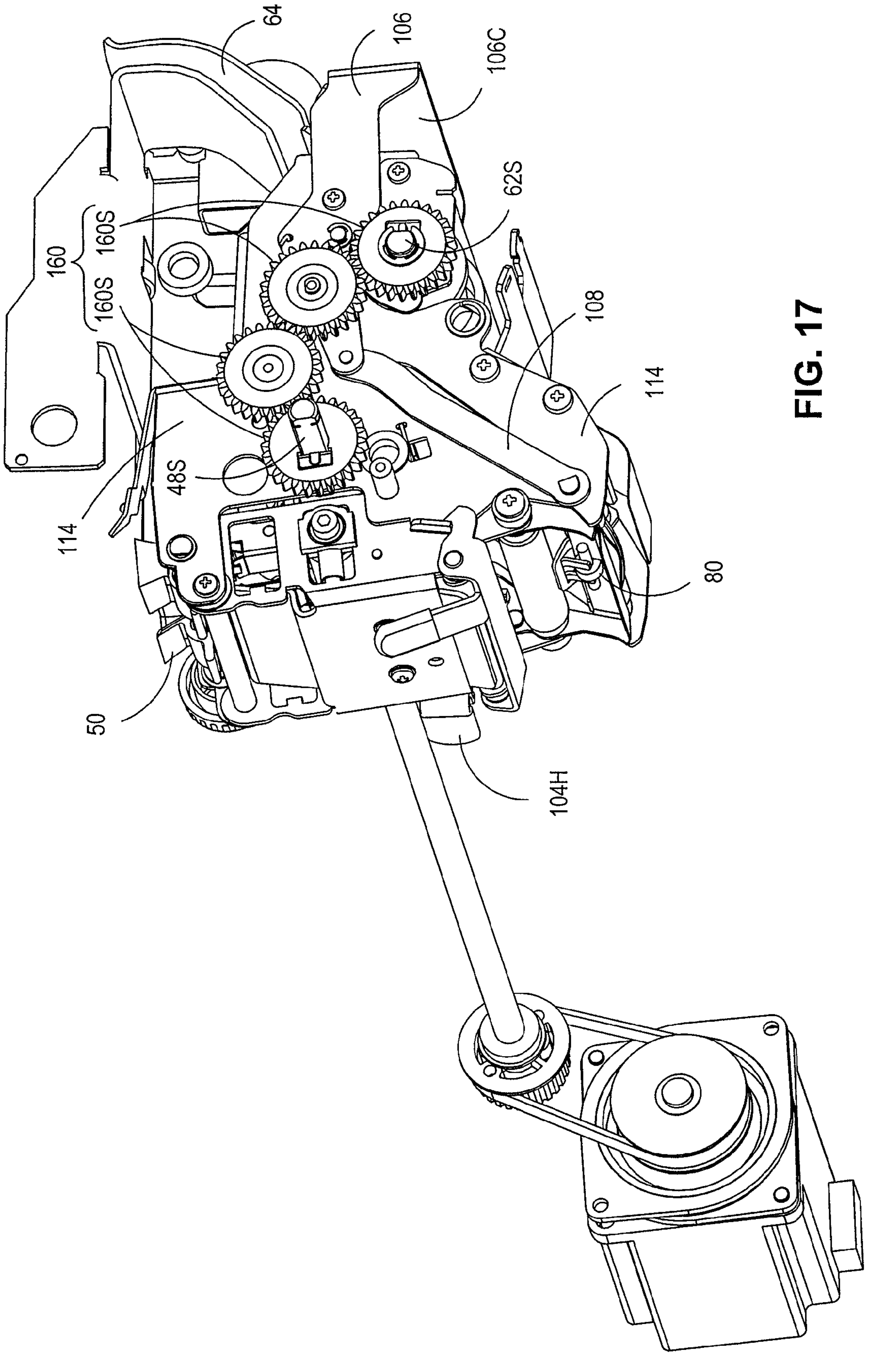
FIG. 17 is a perspective view of another side of the tabbing head depicting a gear train assembly for driving input and output rollers.
Figure 18:
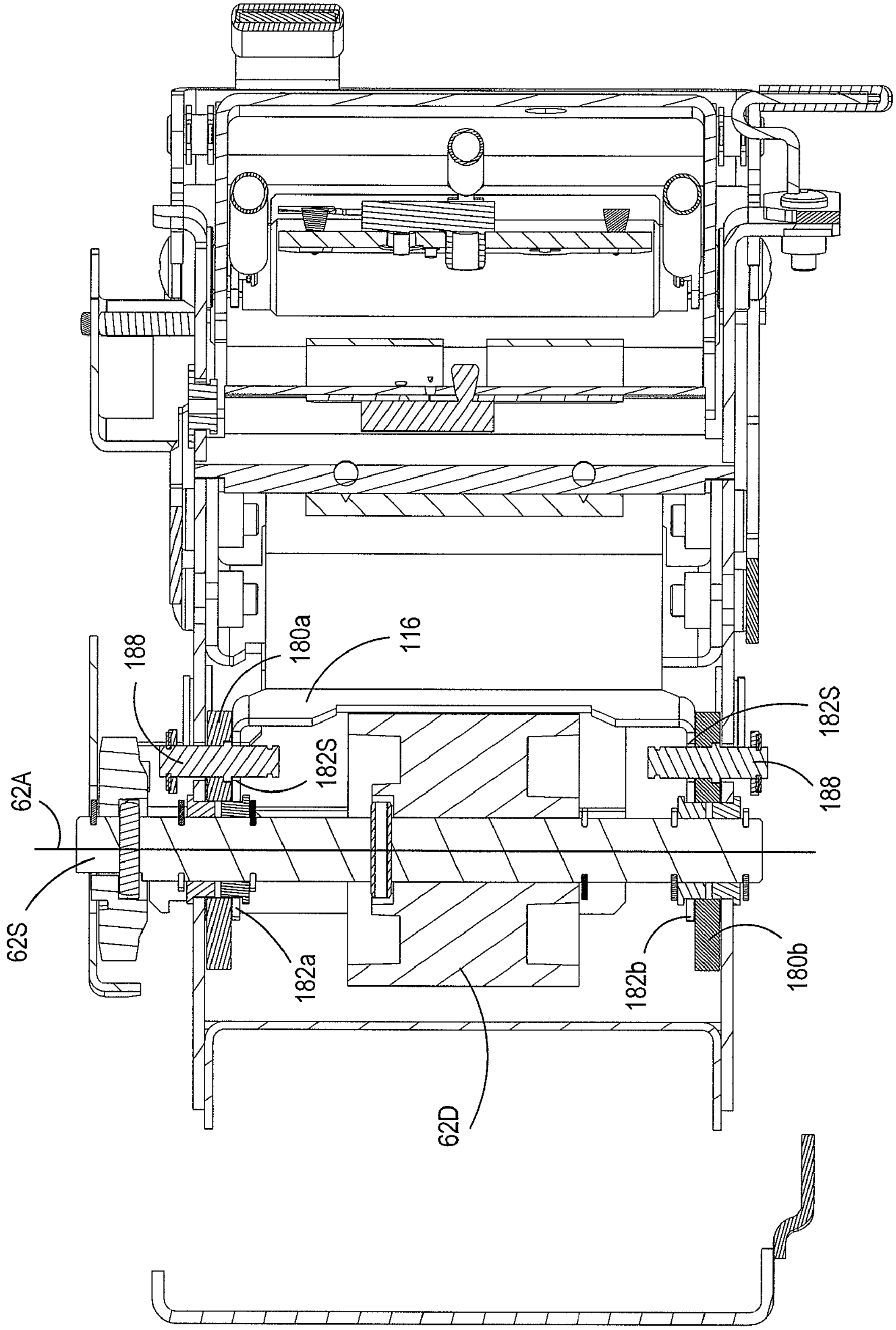
FIG. 18 is a top sectional view taken substantially along line 18-18 of FIG. 15*b* depicting a retractable guide member and an output roller release mechanism operative to engage/disengage an idler roller to/from an output drive roller.

The actuating crank 106 is pivotally mounted to the housing 114 about a first axis A1 and pivot mounted to the aft end 104T of the load lever 104 about an second axis A2. Further, the actuating crank 106 is an integrated structure including a cross member 106C for connecting a pair of crank arms 106R disposed to each side of the housing 114 (only one of the crank arms 106R is shown in FIGS. 14*b*, 15*b* and 16*b*). Moreover, the actuating crank 106 is spring-biased by a torsion spring 122 (shown in phantom in FIGS. 14*b*, 15*b* and 16*b*) in a counter-clockwise direction, and the first and second axes A1, A2 are positioned such that linear motion along line LM of the actuation handle 104H and load lever 104 effects a clockwise rotation of the actuating crank 106. Consequently, the torsion spring 122 is fully loaded or wound when the actuation handle 104H is displaced or pushed inwardly toward the housing 114.

The first connecting links 108 are pivotally connected to each side of the actuating crank 106, i.e., to each of the crank arms 106R, about a third axis A3 (see FIGS. 14*b* and 16*b*) and pivotally mounted about a forth axis A4 (best seen in FIG. 15*b*) to the protruding end portions 70E of the peeler bar 70. Functionally, the first connecting links 108 transfer the motion of actuating crank 106 to the peeler bar 70, i.e., the rotary motion of the crank 106 translates to a substantially linear motion of the peeler bar 70 as it moves within the slots 112 of the housing 114. Furthermore, in response to rotation of the actuating crank 106, the first connecting links 108 position the peeler bar 70 at the upper end of the slots 112U, i.e., in the loading or disengaged position, or at the lower end of the slots 112L, i.e., in the dispensing or engaged position.

The locking/release mechanism 110 is responsive to the linear motion of the load lever 104 and functions to (i) lock the actuating crank 106 in its fully loaded position, i.e., a position corresponding to the dispensing position of the peeler bar 70 (shown in FIG. 15*b*), and (ii) release the actuating crank 106 such that, under the influence of the torsion spring 122, the actuating crank 106 rotates counterclockwise to a position corresponding to the loading position of the peeler bar 70 (shown in FIG. 14*b*).

The locking/release mechanism 110 includes a release lever 126, a pawl 128, and a notch 130 formed along an edge of the actuating crank 106. More specifically, the release lever 126 is pivot mounted to the load lever 104 about a fifth pivot axis A5 located between the actuating crank 106 and the handle 104H of the load lever 104. The release lever 126 is spring-biased about the fifth pivot axis A5 in a counterclockwise direction by a coil spring 132 and includes an abutment surface 134 at one end thereof. Furthermore, the release lever 126 includes a slot 136 for accepting a pin 140 to limit the rotational movement of the release lever 126 about the pivot axis A5. The pawl 128 includes a pawl tooth 142, a locking point 146 and a mounting arm 148 which is pivot mounted to the housing 114 of the tabbing head 30 about a sixth pivot axis A6. Furthermore, the mounting arm 148 is spring-biased in a clockwise direction about the sixth axis A6 by a compression spring 152 acting on a protruding finger 156 of the mounting arm 148.

In the locked position shown in FIG. 15*b*, the load lever 104 is fully depressed inwardly toward tabbing head 30 thereby causing the actuating crank 106 to assume a substantially horizontal orientation, i.e., parallel to the load lever 104. In this orientation, the notch 130 formed along the edge of the actuating crank 106 is engaged with the locking point 146 of the pawl 128. Further, the abutment surface 134 of the release lever 126 is proximal to, but not positively engaged with, the tooth 142 of the pawl 128. Moreover, the pawl 128 is biased by the compression spring 152 in a clockwise direction to retain the position of the actuating crank 104 and, as a consequence, lock the displacement mechanism 100. It should be appreciated that the force of the compression spring 152 and the moment arm produced by the protruding finger 156 is sufficient to counteract the moment load imposed by the torsion spring 122, which also acts on the actuating crank 106. When locked, the peeler bar 70 is in the dispensing position, i.e., at the lower end portion of the slots 112.

To release the locking/release mechanism 110, the load lever 104 is pulled a short distance away from the tabbing head 30 to cause the abutment surface 134 of the release lever 126 to positively engage the tooth 142 of the pawl 128. As the abutment surface 134 engages the tooth 142, the pawl 128 rotates in a counterclockwise direction against the force of the compression spring 152 such that the locking point 146 disengages the notch 130 of the actuating crank 106. Without a counterbalancing moment load acting on the displacement mechanism 100, the torsion spring 122 rotates the actuating crank 106 in a counterclockwise direction. The actuating crank 106 rotates through an angle of about ninety-degrees (90°) to raise the connecting links 108 and move the peeler bar 70 to its loading position, i.e., at the upper end 112U of the slots 112. FIG. 16*b* shows an intermediate position of the displacement mechanism 100 wherein the actuating crank 106 has rotated through an angle β, i.e., about thirty degrees (30°) from the vertical ninety degree (90°) position.

To re-engage the locking/release mechanism 110, i.e., to return the displacement mechanism 100 to the locked position, the load lever 104 is depressed inwardly toward tabbing head 30. As the load lever 104 moves inwardly, a lead-in surface 158 (see FIG. 16*b*) of the release lever 126, i.e., formed orthogonally of the abutment surface 134, engages a backside surface 142*b* of the pawl tooth 142. As the lead-in surface 158 engages the pawl tooth 142, the release lever 126 rotates in a clockwise direction within the rotational limits established by the slot 136 and pin 140 arrangement between the release lever 126 and load lever 104. In response to further linear displacement of the load lever 104, the actuating crank 106 continues to rotate such that the cam surface 130C thereof engages the pawl 128. As the crank 106 continues to rotate, i.e., to a nearly horizontal orientation, the cam surface 130C rotates the pawl 128 against the force of the compression spring 152, i.e., in a counterclockwise direction about the sixth axis A6. When the actuating crank 106 is fully rotated, the locking point 146 of the pawl 128 is biased into engagement with the notch 130 of the crank 106, thereby locking the displacement mechanism 100.

Figure 14A:
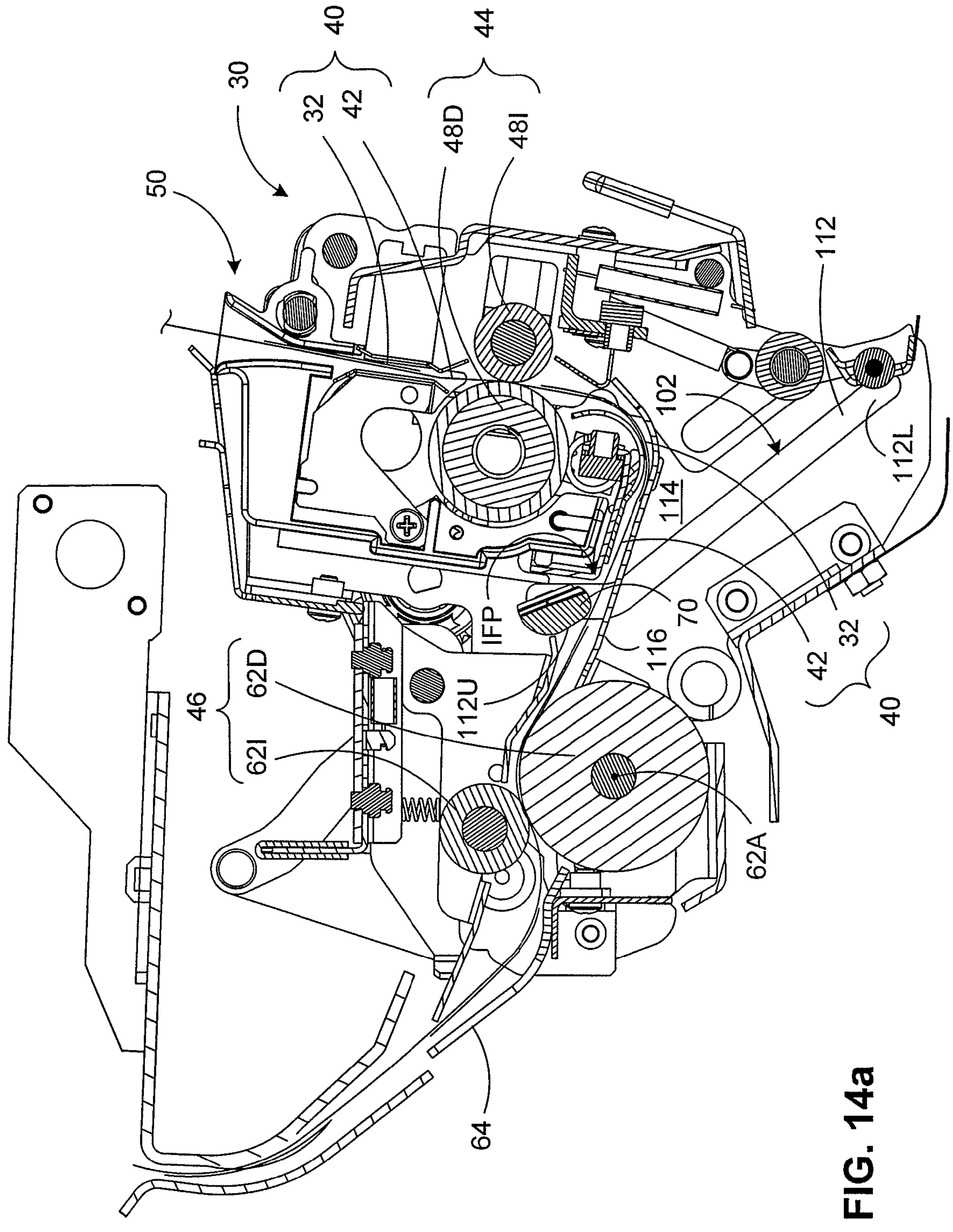
FIG. 14*a* is a side sectional view of the tabbing head depicting the loading position of the peeler bar and revealing the feed path of the tab stock as it is loaded during installation.

Referring to FIGS. 14*a*-18*b*, the tab stock 40 may be fed into the tabbing head 30 and readied for dispensing adhesive tabs 32 with a minimum of operator effort. In FIG. 14*a*, the peeler bar 70 and displacement mechanism 100 are in the loading or installation position, i.e., with the peeler bar 70 disposed at the upper ends 112U of the guiding slots 112. An operator feeds a leading portion of tab stock 40 into the bifurcated guide chute 50 such that the tab stock 40 is captured by and disposed between the nip of the input drive and idler rollers 48D, 48I. The tabbing head 30 is then energized to drive the input drive roller 48D. In the described embodiment, the shaft 48S input drive roller 48D is driven by the shaft 62S of the output, or exit, drive roller 62D though a drive train assembly 160 (see FIG. 17). The drive train assembly 160 comprises several spur gears 160S disposed along an exterior face of the housing 114 (see FIG. 17). A motor (not shown) is rotationally coupled to the shaft 62S of the output drive roller 62D and controlled to drive the input and output rollers 48D, 62D during installation and operation of the tabbing head 30.

As the input drive roller 48D turns (see FIG. 14*a*), the tab stock 40 is fed along the installation feed path IFP which is defined by retractable guide member 116. During installation, the retractable guide member 116 extends across and between the input and output rollers 48D, 48I, 62D, 62I of the input supply and output mechanisms 44, 46. Further, the guide member 116 is disposed internally of the housing 114 and between the slots 112 for engaging/guiding the peeler bar 70. Moreover, when the peeler bar 70 is disposed at the upper end 112U of the slots 112, the peeler bar 70 is spatially positioned above the guide member 116 and to one side of the installation feed path IFP.

Once fed to the output drive and idler rollers 62D, 62I, the tab stock 40 is captured therebetween and driven to the exit channel 64. Thereafter, a small length of tab stock 40 is collected on the output take-away reel 38 (see FIG. 2) in preparation for dispensing operations by the tabbing head 30.

To perform dispensing operations, various elements of the tabbing head 30 are reconfigured/repositioned to enable the peeler bar 70 to assume the dispensing position. These elements include the guide member 116 and idler roller 62I of the output rollers 62. While these elements may be reconfigured by various motion producing devices, e.g., rotary or linear actuators, in the described embodiment, the displacement mechanism 100 provides the motive force necessary to displace the peeler bar 70, the guide member 116 and the idler roller 62I. More specifically, the displacement mechanism 100 moves the peeler bar 70 from one end 112U of the slots 112 to the opposite end 112L across the installation feed path IFP. In FIG. 16*b*, the peeler bar 70 has moved from the upper end 112U of the guide slots 112, i.e., from the loading position (shown in FIG. 14*a*) to an intermediate position (shown in FIG. 16*a*) between the ends 112U, 112L. Before crossing the installation feed path IFP, however, the displacement mechanism 100 is operative to pivot the retractable guide member 116 and disengage/engage the idler roller 62I from the output drive roller 62D.

Figure 19:
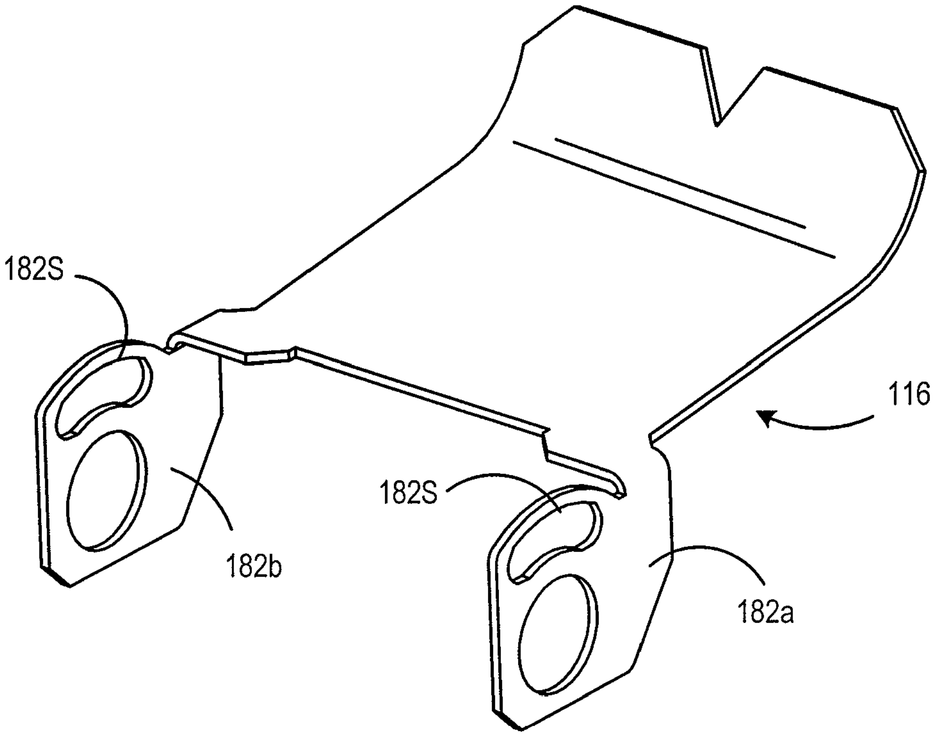
FIG. 19 is an isolated perspective view of the retractable guide member including a pivot mount having slotted brackets to limit the rotational displacement of the guide member.
Figure 20:
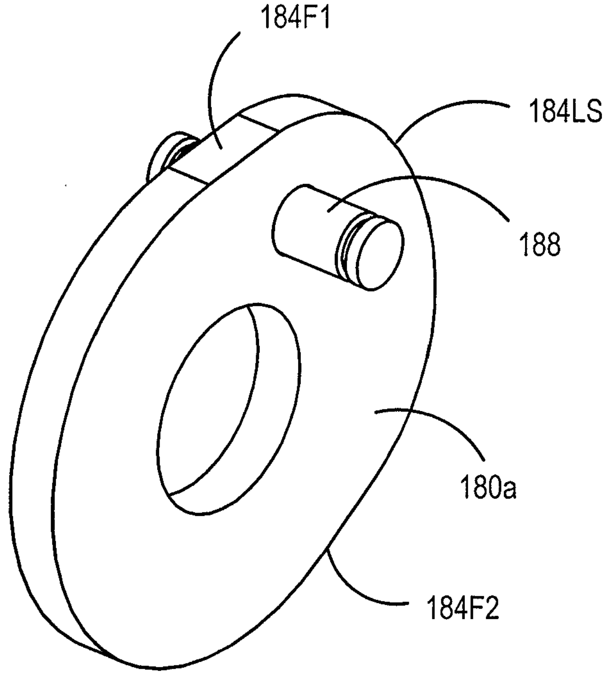
FIG. 20 is an isolated perspective view of a cam element of the output roller release mechanism for raising and lowering the idler roller on each side of the output drive roller.
Figure 21:
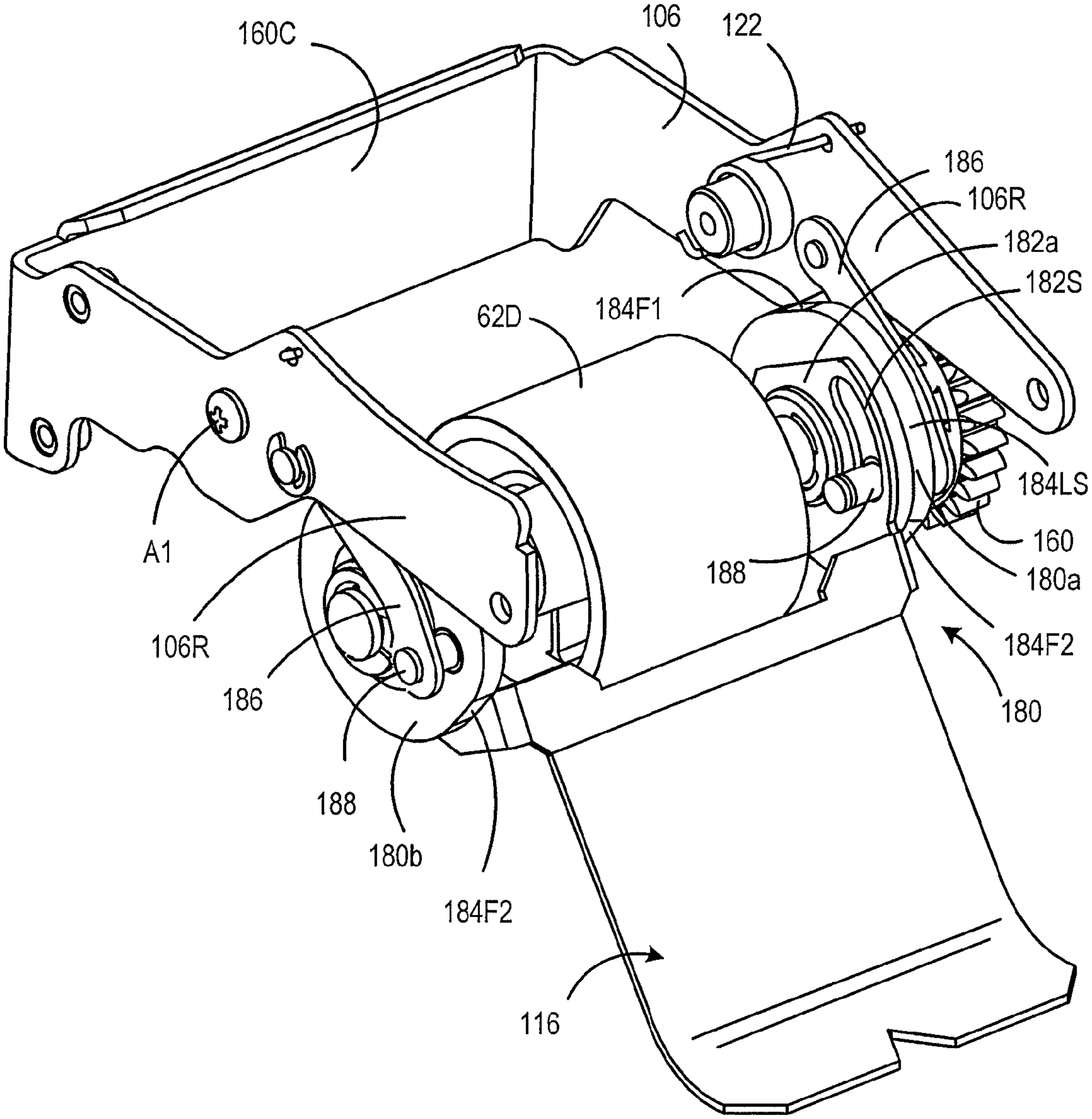
FIG. 21 is a perspective view of several components assembled in combination with the output drive roller including the retractable guide member, cam elements, follower links, and the actuating crank.

More specifically, and referring to FIGS. 15*a*, 16*a*, 18 through 21, the retractable guide member 116 (best seen in FIGS. 16*a*, 19 and 20) is displaced to allow the peeler bar 70 free movement within the guide slots 112. In FIGS. 19 and 21, the retractable guide member 116 is includes a pair of slotted brackets 182*a*, 182*b* for mounting about the rotational axis 62A of the output drive roller 62D. Furthermore, the retractable guide member 116 rotates in a clockwise direction in response to the rotation of an output roller release mechanism 180 (discussed in greater detail below). Moreover, the retractable guide member 116 rotates to a position which is substantially parallel to, and away from the peeler bar displacement path provided by, the guide slots 112.

In the described embodiment and referring to FIG. 16*b*, the output idler roller 62I is mounted to a pivoting arm or fixture 170 which is spring-biased downwardly by a compression spring 176. More specifically, the fixture 170 pivots about an axis A7 such that idler roller 62I pressingly engages the drive roller 62D as a consequence of a counterclockwise moment load imposed by the compression spring 176.

The output roller release mechanism 180 includes a pair of cam elements 180*a*, 180*b* (see FIGS. 18*a*, 20 and 21) which are rotationally mounted about the shaft axis 62A of the output drive roller 62D. Each of the cam elements 180*a*, 180*b* is disposed to a side of the output drive roller 62D and cooperate to raise and lower the idler roller 62I into and out of engagement with the output drive roller 62D. Disposing the cam elements 180*a*, 180*b* to each side of the output drive roller 62D serves to equalize the moment loads acting on the output idler roller 62I. The relative displacement between the output idler and drive rollers 62I, 62D produces a gap GP therebetween such that, when the peeler bar 70 engages the tab stock 40, as seen in FIG. 16*a*, a length of tab stock 40 may be drawn back from the output take-away reel 38. That is, separation of the output rollers 62D, 62I releases the tab stock 40 such that an additional length thereof may be drawn from the output reel 38 without being restrained/resisted by the nip of the output rollers 62. It will be appreciated that the requisite length of additional tab stock 40 must extend around and engage the peeler bar 70 when disposed in its dispensing position.

In FIGS. 16*a*, 18*a*, 20, and 21, each of the cam elements 180*a*, 180*b* (only one cam element is shown in FIG. 20) includes flat surfaces 184F1, 184F2 disposed on each side of an arcuate lifting surface 184LS. A pair of follower links 186 (only one being shown in FIG. 21) connects the actuating crank 106 to the output roller release mechanism 180. That is, each end of a follower link 186 is pivotally mounted to the actuating crank 106 and to the output roller release mechanism 180 to impart rotation thereto in response to rotation of the actuating crank 106.

In a first rotational position, i.e., corresponding to the loading position of the peeler bar 70, a first flat surface 184F1 of the cam members 180*a*, 180*b* allows the fixture 170 to pivot the idler roller 62I into engagement with the drive roller 62D. That is, the flat surface 184F1 does not engage the fixture 170 so as to raise the idler roller 62I relative to the drive roller 62D. Accordingly, during installation, tab stock 40 may be driven through the nip of the output rollers 62D, 62I.

In one of a plurality of intermediate rotational positions, i.e., corresponding to any one of the intermediate positions of the peeler bar 70 (see FIG. 16*a*), the arcuate lifting surface 184LS of the cam members 180*a*, 180*b* engages a shaft abutment surface 172 of the fixture 170 to pivot and lift the idler roller 62I out of engagement with the output drive roller 62D, i.e., pivoting the fixture 170 is a clockwise direction about axis A7. As the cam members 180*a*, 180*b* rotate to lift the idler roller 62I, the retractable guide member 116 is also rotated downwardly, in a clockwise direction, to facilitate movement of the peeler bar 70. Slots 182S formed within each mounting bracket 182*a*, 182*b* are engaged by pins 188 which project inwardly from a face surface of each cam element 180*a*, 180*b*. The slots 182S permit the cam elements 180*a*, 1180*b* to rotate through a larger angle, i.e., about one-hundred and forty degrees (140°), than the retractable guide member 116 which rotates through an angle of about fifty degrees (50°).

It should also be appreciated that when traversing the various intermediate positions, the peeler bar 70 crosses the installation feed path IFP, engages the tab stock 40 and draws the requisite additional length of tab stock necessary to dispense adhesive tabs 32. Accordingly, as the peeler bar 70 engages and requires additional length of the tab stock 40, the gap GP provided between the output drive and idler rollers 62D, 62I enables the tab stock 40 to be drawn back from the output take-away reel 38.

In a final or third rotational position, i.e., corresponding to the dispensing position of the peeler bar 70, the second flat surface 184F2 of the output roller release mechanism 180, once again, allows the fixture 170 to pivot the idler roller 62I into engagement with the drive roller 62D. That is, the flat surface 184F2 no longer engages the shaft abutment surface 172 of the fixture 170 and the idler roller 62I pressingly engages the drive roller 62D. Accordingly, when dispensing adhesive tabs 32, the tab stock 40 may be drawn through the nip of the output rollers 62 to pull the carrier substrate 42 around the peeler bar 70.

In operation, tension is applied to the tab stock 40 to dispense the adhesive tabs 32 i.e., as the carrier substrate 42 abruptly changes direction around the peripheral surfaces 72, 74 of the peeler bar 70. The tensile loading is maintained at a substantially constant level by the arrangement and mechanism for driving/braking the input and output rollers 48, 62. More specifically, the diameter of the output roller 62 is larger than the diameter of the input roller 48 such that more of the carrier substrate 42 may be reeled or drawn by the output rollers 62 (i.e., with each revolution of its driven shaft) relative to the input rollers 48. To accommodate this speed and length differential, the overrunning clutch between the input drive roller 48D and its drive shaft (which is driven by the gear train assembly 160) permits the input roller 48 to overrun relative to the drive shaft.

In addition to the inherent drag and friction forces developed within the tabbing head, e.g., through the input and output rollers 48D, 48I, 62D, 62I and around the peeler bar 70, additional drag may be introduced by a conical brake (not shown in the figures) disposed on the shaft of the input drive rollers 48D, 48I. More specifically, the conical brake includes an actuator for driving a cone element into an out of engagement with the input drive roller 48D. The cone element includes an aperture for accepting the input roller shaft and a friction surface in the shape of a cone for bearing against an end of the input drive roller 48D. The actuator displaces the friction surface of the cone element into and/or out of engagement with the input drive roller 48D. Consequently, the conical brake applies a load tending to dampen or slow the rotation of the input drive roller 48D.

Feedback Sensing System for Positioning Adhesive Tabs

Thus far in our discussion, various inventive components, mechanisms and assemblies have been described for dispensing adhesive tabs 32 and reconfiguring the tabbing head 30 to facilitate set-up/installation of tab stock 40. Another inventive system, however, relates to a feedback sensing system 200 for accurately positioning the tab stock 40 to ensure that the adhesive tabs 32 are properly pre-positioned during dispensing operations. That is, the adhesive tabs are pre-positioned to ensure that the free edges of the folded sheet material adhesive tabs 32. More specifically, the feedback sensing system synchronizes the timed arrival of the folded sheet material, i.e., a free edge thereof, with the length/amount of adhesive tab 32 which extends beyond the peeler bar 70.

Figure 22:
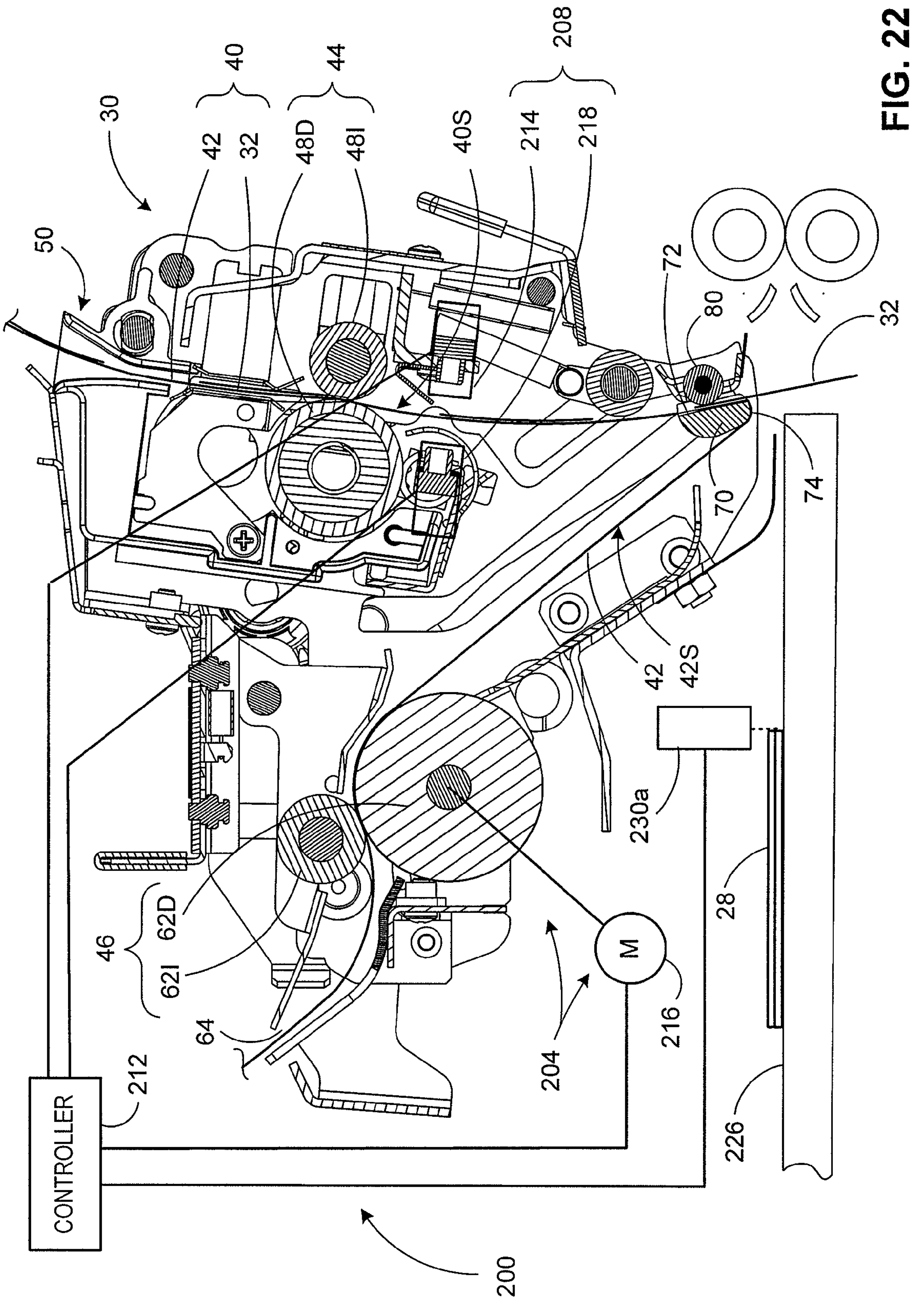
FIG. 22 depicts another embodiment of the invention including a feedback sensing system having a drive mechanism for adaptively driving tab stock around the peeler bar, a sensing device operative to sense the position of each adhesive tab and a controller for adaptively controlling the drive mechanism.

In the described embodiment, and referring to FIG. 22, the feedback sensing system 200 includes a drive mechanism 204 for adaptively driving tab stock 40 around the peeler bar 70, a sensing device 208 for issuing a signal indicative of the spatial position of each adhesive tab 32, and a signal processor or controller 212, operatively coupled to the sensing device 208, for determining the spatial position of each adhesive tab 30 relative to a reference point (i.e., a surface or edge of the tabbing head 30 such as the lower edge of the peeler bar 70)

and adaptively controlling the drive mechanism 204 to optimally preposition each adhesive tab 32. It should be appreciated that various signal processing functions required to, for example, determine the location of or spacing between adhesive tabs 32, or adaptively control the drive mechanism 204 may be distributed across multiple microprocessors or fulfilled within a single system controller/microprocessor.

The drive mechanism 204 includes the output drive and idler rollers 62I, 62D and a motor 216 for driving the output drive roller 62D. In the exemplary embodiment, the motor 216 is a stepper motor controlled by timed pulses, e.g., turned on for a threshold period of time/number of pulses/steps, to dispense sequential adhesive tabs 32. Moreover, the motor 216 may be adaptively driven/controlled to increase or decrease the period of time/number of pulses/steps that the motor is energized to adjust the position of the tab stock 40. Consequently, the position of each adhesive tab 32 may be pre-positioned relative to an edge of the peeler bar 70 (e.g., bottom edge between the first and second peripheral surfaces 72, 74). Stated in other terms, the motor 216 may cause to the tab stock 40 to advance or retreat relative to the reference surface or edge, i.e., in relatively small increments, such that each adhesive tab 32 is optimally pre-positioned for tabbing operations. While the motor 216 is preferably timed to drive the position of the adhesive tabs 32, it will be appreciated that other methods are available to adaptively control the drive mechanism 204. For example, the rotational speed of the motor 216 may be adaptively controlled to effect the same result, albeit, other factors such as the position of the underlying sheet material 28 may require additional control or feedback.

The sensing device 208 may be an optical sensing device located at a position between the bifurcated input guide chute 50 and the peeler bar 70. The optical sensing device 208 is operative to provide a sensed signal indicative of the location of adhesive tabs 32 along the input stream 40S of the tab stock 40. More specifically, the optical sensor 208 includes a light source 214 disposed on one side of the tab stock 40, i.e., the side which carries the adhesive tabs 32, and a receiver 218 disposed on the opposite side to detect the transmission of light through the tab stock 40. The optical sensing device 208 examines the transmission of light through the tab stock 40, i.e., the intensity of light transmitted, to sense each adhesive tab 32.

In the described embodiment, the sensing device 208 may be used to detect: (i) the location of a leading and/or trailing edge of an adhesive tab 32, (ii) the size, e.g., length and/or diameter of an adhesive tab 32, and (iii) the relative spacing or distance between adhesive tabs 32. Inasmuch as the precise distance between the light source 214 and the peeler bar 70 is known, the sensed data can be used to determine the relative position of each adhesive tab 32 relative to the peeler bar 70, e.g., how far the leading edge of an adhesive tab 32 will project beyond a lower edge of the peeler bar 70. For example, if: (i) each adhesive tab 32 is one inch (1") in diameter, (ii) the spacing between the leading edges of sequential adhesive tabs 32 is one and one-half inches (1½"), and the distance between the sensing device 208 and lower edge of the peeler bar 70 is two and one-half inches (2½"), then an adhesive tab 32 will extend one-half inches (½") beyond the peeler bar 70 when the sensing device 208 senses the leading edges of three sequential adhesive tabs 32. That is, upon detecting a third leading edge, the feedback sensing system 200 can ensure that an adhesive tab 32 will be favorably positioned for being dispensed, i.e., so that equal halves of each adhesive tab 32 will adhere to each side of the free edge to be secured.

In addition to determining the spatial position of each adhesive tab 32, the feedback sensing system 200 may be employed to detect the leading and trailing edge positions of sequential adhesive tabs 32 on the tab stock 40. As such, the edge spacing between adhesive tabs 32 may be calculated. Furthermore, an average edge spacing in connection with a plurality of adhesive tabs 32 may be calculated to adjust the timing of the stepper motor 216 over the course of tabbing operations. That is, deviations in edge spacing may occur along the length of the tab stock 40 due to manufacturing deficiencies. To compensate for such deviations, the timing of the drive mechanism 204 may be advanced or retarded to correctly position the tab stock.

The controller 212 is also operative to vary or adjust the position of tab stock 40 such that each and every adhesive tab 32 will be optimally pre-positioned during tabbing operations. It will be appreciated that the controller 212 may statically or dynamically control the drive mechanism 204. During initial set-up, i.e., immediately following the installation of tab stock 40 within the tabbing head 30, the feedback sensing system 200 may statically pre-position a first adhesive tab 32 to initiate tabbing operations. Thereafter, or during routine tabbing operations, the feedback sensing system 200 may also dynamically pre-position the adhesive tabs 32 as each is dispensed. That is, the spatial position of each adhesive tab 32 is determined, the length of time/number of pulses for energizing the stepper motor 216 is calculated to optimally pre-position each adhesive tab 32, and the motor 216 is driven to move and dispense the adhesive tab 32. In the tabbing head 30 described herein, adhesive tabs 32 are dispensed at a rate of nearly five (5) tabs every second.

In addition to static and dynamic control of the drive mechanism 204, the controller 212 processes the sensed signals, i.e., those issued by the optical sensing device 208, to determine an average edge spacing between sequential adhesive tabs 32. More specifically, the controller 212 determines the edge spacing between each adhesive tab 32 based upon the leading and trailing edge positions and stores an average edge spacing in connection with a plurality of adhesive tabs 32 during tabbing operations. As tabbing operations continue, the controller 212 may determine whether the average edge spacing has deviated by a threshold value. That is, the controller 212 monitors the edge spacing between the adhesive tabs 32 to determine whether the spacing has shifted/deviated by a predetermined amount. When this condition is met, i.e., when the average edge spacing has deviated sufficiently to warrant correction, the controller 212 is operative to adaptively control the drive mechanism 204 to adjust the timing of the stepper motor 216 or speed of a variable output motor.

Figure 23:
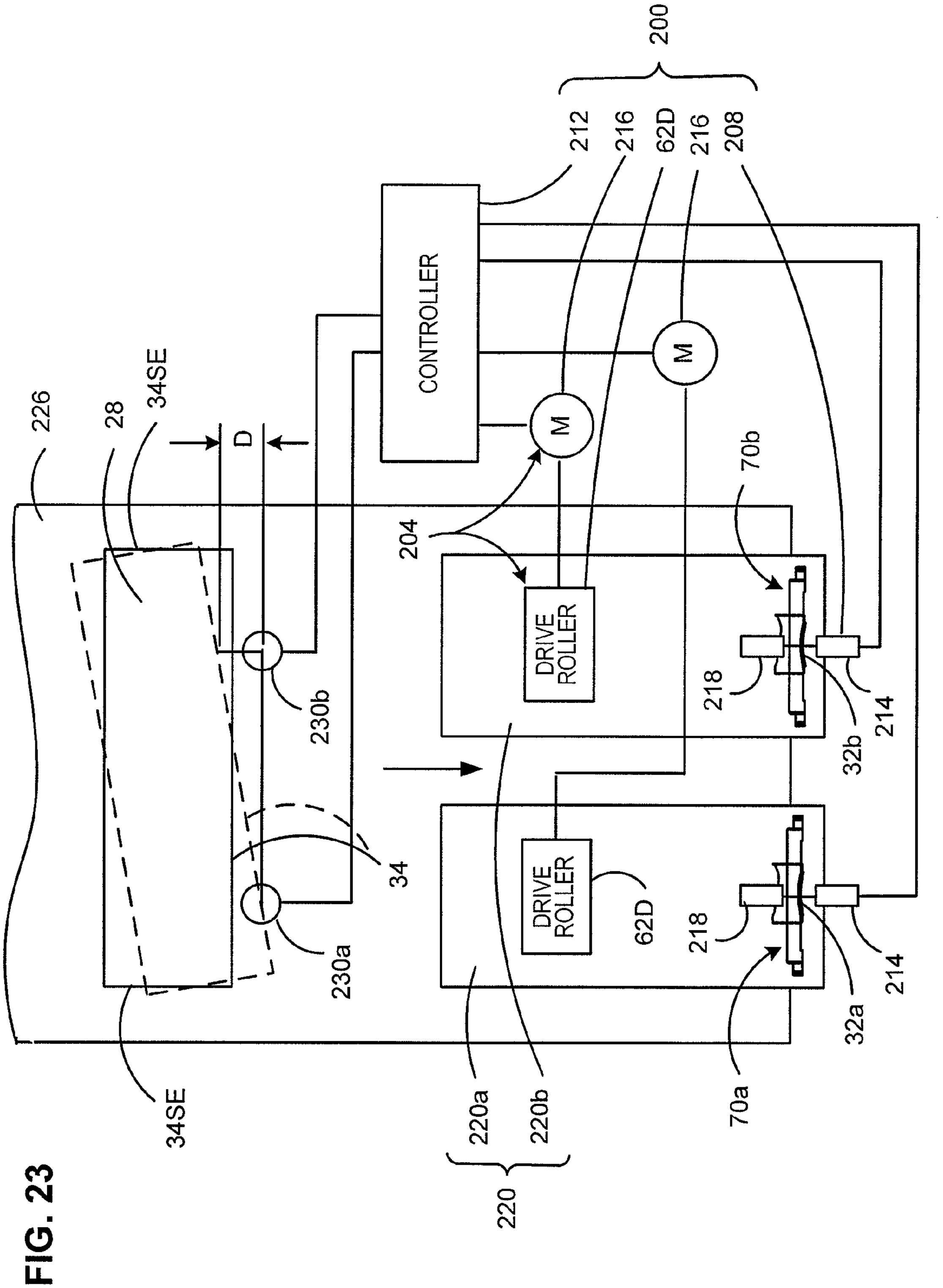
FIG. 23 depicts yet another embodiment of the invention wherein the feedback sensing system includes sensors to detect the angular position of the folded sheet material to accurately position adhesive tabs at two locations along the free edge of the sheet material when performing dual head tabbing operations.

In yet another embodiment of the invention, the controller 212 may be used to facilitate and improve the accuracy of tabbing operations which employ dual tabbing heads. More specifically, and referring to FIGS. 22 and 23, a dual head tabbing apparatus 220 includes side-by-side tabbing heads 220*a*, 220*b* which are each operative to place and secure an adhesive tab 32 at two locations along the free edge 34 of the folded sheet material 28. Generally, the tabs 32 are proximal to the side edges 34SE of the sheet material 28, e.g., about one inch (1") inboard of the side edges 34SE.

Inasmuch as the folded sheet material 28 travels along a conveyor deck 226 at a relatively high rate of conveyance, e.g., five (5) pieces of folded sheet material 28 every second, the sheet material 28 may on several occasions shift or become skewed (see FIG. 23) on the conveyor deck 226. As a result, the free edge 34 of the sheet material 28 may not contact each of the dispensed adhesive tabs 34, i.e., the tabs 32 being dispensed from the tabbing heads 220*a*, 220*b*, simultaneously. That is, a first adhesive tab 32*a* may be dispensed at a first location in advance of the second adhesive tab 32*b* at a second location. Hence, should the timing of the drive mechanism 204, i.e., the stepper motor 216, be identical for driving the tab stock 40 in both tabbing heads 220*a*, 220*b*, at least one of the adhesive tabs 32 will not be properly positioned. That is, the tab 32 will not be symmetrically divided across the free edge to secure the folded sheet material 28.

To ensure that the adhesive tabs 32 are properly located along the free edge of the folded sheet material 28, even when the folded sheet material 28 becomes skewed (shown in dashed lines) along the conveyor deck 226, additional position sensors 230*a*, 230*b* may be disposed downstream of each of the dual tabbing heads 220*a*, 220*b*. More specifically, the sensors 230*a*, 230*b* provide the controller 212 with relative position data at two points along the edges of the folded sheet material 28. For example, the sensors 230*a*, 230*b* and controller 212 may determine that the distance from the leading edge 34 to the respective peeler bars 70*a*, 70*b*, i.e., at two points along the leading 34 edge, differs by a distance D. Consequently, the controller 212 may adaptively control the position of each adhesive tab 32 based upon (i) the sensed position of each adhesive tab 32*a*, 32*b* within each of the tabbing heads 220*a*, 220*b* and (ii) the relative distance to each of the tabbing heads, e.g., to the peeler bars 70*a*, 70*b*. The controller may, therefore, optimally preposition or dispense the adhesive tabs 32*a*, 32*b* ensure proper placement at both positions along the leading edge.

Calibration Routine

The analogue signal returned by the sensor 208 is compared against a pair of thresholds. When the signal rises above a higher threshold value, the trailing edge of the adhesive tab 32 is recorded. When the signal then falls below a lower threshold value, the leading edge of the next adhesive tab 32 is recorded.

These thresholds are defined via a calibration routine which is performed during the loading process. Significant variability in the transparency of the adhesive tabs 32 has been observed between different material types, however variability has also been observed within a single reel of tab stock 40. It is for this reason that the calibration routine is also performed while the tabbing cycles are being performed. These 'in cycle' values are used to update the stored values if a trend is recorded in the average tab density. The variability is sufficient within the carrier substrate 42 and tab density that the light emission needed to shine through the backing of one type of tab may be so intense that when shone through a more transparent tab, the receiver will be overloaded and unable to record a difference between tab and gap.

The calibration routine is performed during the loading process. When the output tab stream has entered the exit rollers 62D, 62I and there has been sufficient time for the tab stream to be pulled taught, the transparency of the tabs 32 can be measured. This process mainly occurs while the tab stock 40 needed to reach the take away reel 38 is being fed. However, if necessary additional material can be fed until a successful measurement has been accomplished.

Emitter Calibration

The tab stock 40 is driven slowly past the sensor 208 and emitter is driven via an adjustable PWM which is cycled through a series of specific settings at a rate that equates to several cycles/milli-meter of tab stock 40. A sample of five (5) adhesive tabs 32 are measured to minimize the risk of an unusual tab disrupting/degrading the results. Inconsistent results will trigger the measuring of additional samples to establish a reliable set of data. If the system cannot achieve a consistent set of values, or they fall beyond acceptable thresholds, then an error signal is recorded and the calibration process declared a failure. The peak and trough values provide the data used to calculate the upper and lower trigger thresholds used when running to determine the leading and trailing edges of the adhesive tabs 32.

This process enables the electronics and software to establish the emitter settings that will achieve the greatest contrast in received values between tab and gap Tab Size Calibration Once the emitter settings have been defined, the controller 212 will then use these values to measure the leading and trailing edges of a subsequent series of tabs 32. The number of motor steps driven between each edge is recorded and this value multiplied by the theoretical number of motor steps to drive a distance ratio to calculate the tab length. As most tabs are made to standard sizes e.g. one-half inches to one and one half inches (1½); the calculated value is compared against these standard sizes. If the value is within a predefined tolerance of one of these values; then the controller 212 will offer this value to the operator as the size of the tab 32 via the user interface. If the calculated size is beyond the predefined tolerance of these standard sizes then the calculated value will be offered without adjustment to the operator. The operator then has the option of accepting the proposed tab dimension or correcting it via the user interface controls.

The resulting selected tab length is then divided by the number of motor steps per tab to calculate the actual motor steps/milli-meter which is then used by the controller 212 when calculating number of motor steps needed to apply tabs to the mailpiece or folded sheet material 28.

Integrated Folder/Tabbing Apparatus

Figure 24:
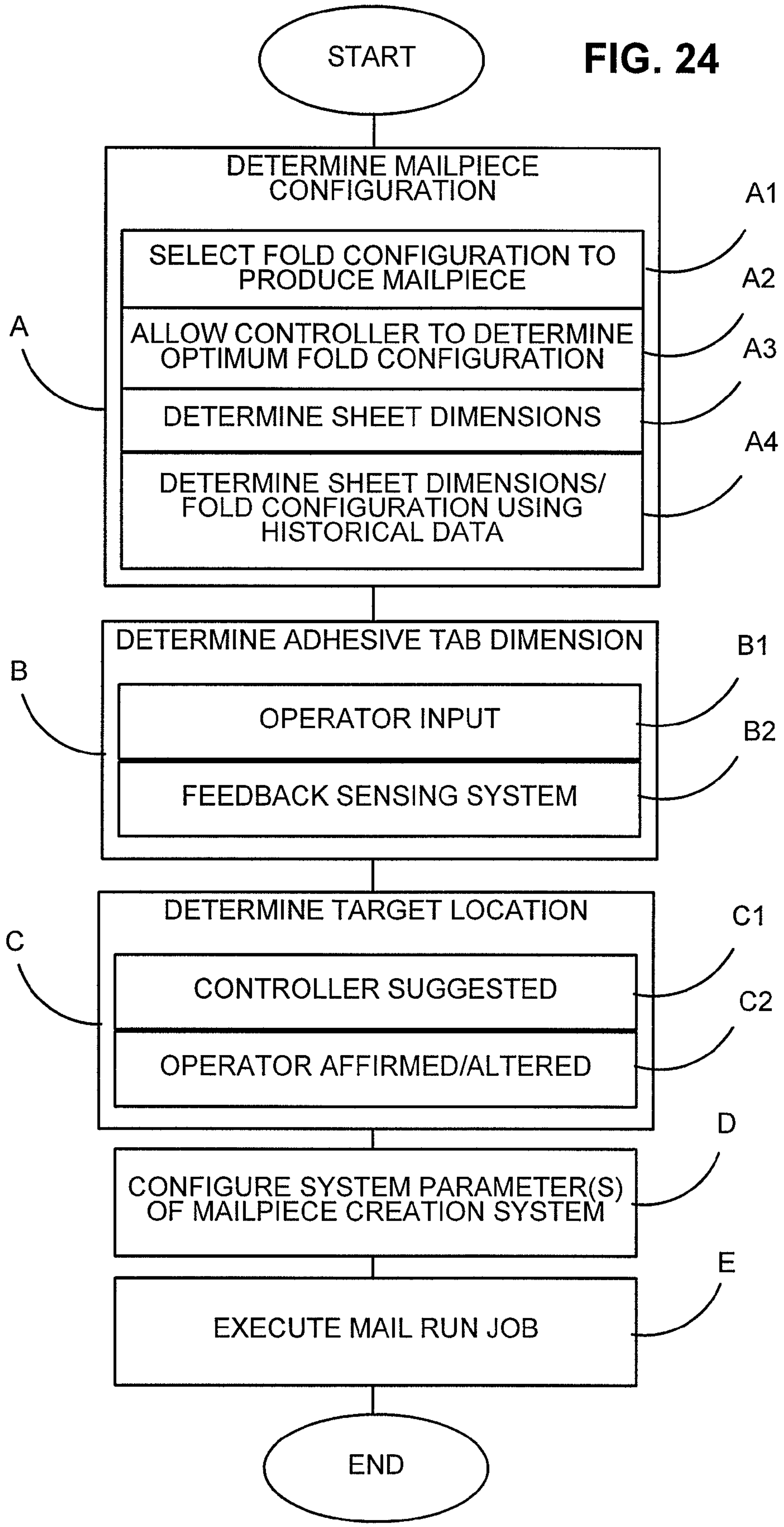
FIG. 24 depicts a method for expediting system set-up by integrating various functions of the folding station with the tabbing apparatus.

In another embodiment of the invention and referring to FIGS. 1 and 24, the mailpiece creation system 10 integrates the functions of the folding station 14 with the tabbing apparatus 20 to expedite and simplify system set-up. That is, the mailpiece creation system 10 integrates these functions to minimize set-up time, mitigate errors, and reduce the skill level required to create mailpieces/operate the mailpiece creation system 10.

Specifically, in a first step A, the fold configuration or type of fold is determined for creating a mailpiece. While this information may be determined by sensors disposed internally of the folding station 14, generally, this information will be input by an operator, i.e., via an input device such as a keyboard or input display. For example, in step A1, an operator may select one of a plurality of candidate fold configurations such as a bi-fold, tri-fold, gate-fold, C-fold, Z-fold, or cross-fold configuration.

Alternatively, in step A2, the controller 212 may receive information concerning a selected number of panels (e.g., 2, 3, 4 etc.) together with a desired panel size to determine the optimum fold configuration. Consequently, in this step, the controller 212 selects an optimum fold configuration based upon operator inputs, such as the number of and size of panels, which relate to the fold configuration.

Alternatively, in step A3, the dimension of the sheet material 28 is determined in addition to the fold configuration defined in steps A1 and A2 above. This information may be obtained from internal system sensors i.e., measuring the leading and trailing edge position of each sheet as it enters the mailpiece creation system or via operator input, i.e., through the input device.

Alternatively, in step A4, the controller 212 may retrieve stored information concerning customer preferences to determine/suggest a particular paper/panel size or fold configuration. For example, the controller 212 may access a database of customer preferences (e.g., historical data of previous mailpiece run jobs associated with various customers) to prompt or suggest a particular fold configuration or sheet size.

In step B, the size of the adhesive tab 32 employed to secure the folded sheet material 28 is determined. Once again, in step B1, this information may be received from operator inputs (via the input display device) wherein the operator may select from tab sizes ranging from one-half inches (½") to one and one-half inches (1½"). Alternatively, in step B2, the size of the adhesive tab 32 may be acquired by the feedback sensing system 200 discussed in the previous section. It will be recalled that the controller 212 may receive information from the sensing device 208 to determine the diameter or length of the adhesive tabs 32.

Once the fold configuration and dimension of the adhesive tabs 32 is determined, a target location is identified/determined on the folded sheet material 28, in step C, for dispensing one or more adhesive tabs 32. In this step, the system controller 212 retrieves stored information regarding suitable locations for dispensing a tab. This information may be based upon a) postal requirements, e.g., an adhesive tabs must be a minimum distance from a side edge of a mailpiece, b) the selected fold configuration e.g., a gate-fold dictates tab placement at a mid-point of the center panel, c) the type of tabbing operation required e.g., edge or surface tabbing, and d) the size/type of adhesive tab to be used e.g., when surface tabbing, a large diameter tab must not project beyond a folded edge.

In step C1, the controller 212 may display a suggested/candidate target location for dispensing an adhesive tab to the operator. In step C2, the operator may confirm/accept the selection made by the controller 212 concerning the target location or may chose another/alternate location.

In addition to controlling various functions of the tabbing apparatus 20, the controller 212 also issues command signals to various electronically actuated set-up devices of the mailpiece creation system 10. For example, the controller 212 may control the stepper motor (not shown) for driving the sheet material conveyor 26 (which controls the mailpiece processing speed. Further, the controller 212 may drive various diverter flaps for dictating the feed path and fold configuration of the sheet material. Moreover, the controller 212 may configure the sheet inverter to provide the free edge of the folded sheet material 28 in a face-up or face down orientation for either surface or edge tabbing operations.

In step D, at least one of various system parameters/setting of the mailpiece creation system 10 are configured by the controller 212. In the context used herein a "system parameter" is any control parameter of the mailpiece creation system which is variable depending upon operator inputs, system sensor inputs (including the feedback sensing system discussed in the preceding section) or a combination thereof. For example, should the mail job run employ a dimensionally large bi-fold sheet, the processing speed or conveyance deck speed may be increased to compensate for a larger distance between free edges (i.e., the tabbed edge) of each sheet. As yet another example, when folded, a tri-fold sheet may result in free edge which is face down and, as such, must be flipped face up by an inverter to perform tabbing operations. Consequently, the state or default setting of the inverter must be configured, i.e., turned on or off, to change the orientation of each folded sheet. Examples of other devices which are influenced/controlled by the system parameters include, inter alia, the system processing speed, the timing of a stepper motor for driving the conveyor deck, the default setting for an inverter assembly, the orientation of diverters, actuation of diverter flaps, fold plates and the feedback sensing system 200 discussed above (i.e., to obtain dimensional data regarding the adhesive tabs 32).

Finally, in step E, the mail run job is executed by the mailpiece creation system 10 based upon the various system parameters/settings.

In summary, the mailpiece creation system 10 includes a novel peeler bar for accurate and reliable dispensing of adhesive tabs from the carrier substrate. The, unique contours of the peeler bar provides stiffness to enhance dispensing operations while also providing a favorable geometry for surface tabbing operations. A reconfigurable tabbing apparatus facilitates loading/threading of the tab stock by means of a displacement mechanism which moves the peeler bar into and out of engagement with the tab stock. Furthermore, a retractable guide is pivotable to facilitate displacement of the peeler bar. The feedback sensing system adaptively controls the tab stock to accurately position each adhesive tab, i.e., for both an initial adhesive tab and sequentially dispensed tabs. The feedback sensing system also includes sensors upstream of the tabbing head to adjust the delivery of adhesive tabs should the folded sheet material become skewed. Finally, the mailpiece creation system includes an integrated folder/tabbing apparatus to expedite system set-up. The controller integrates, processes and controls the various system set-up functions of the folding/tabbing apparatus to reduce set-up time, reduce errors and decrease the skill required to perform tabbing operations.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

The invention claimed is:

1. A method for configuring a mailpiece creation system, the method comprising the steps of:

determining a fold configuration of a sheet material employed in the creation of a mailpiece;

determining at least one dimension of an adhesive tab for securing a free edge of the sheet material by sensing the leading and trailing edge locations of an adhesive tab and determining the dimension of the adhesive tab based upon the leading and trailing edge locations;

determining a target location for the placement of each adhesive tab relative to the free edge on a folded sheet material;

configuring at least one system parameter of the mailpiece creation system in accordance with at least one of the fold configuration, adhesive tab dimension, and target location; and executing a mail run job by the mailpiece creation system.

2. The method according to claim 1 further comprising the step of determining at least one dimension of the sheet material used to produce a mailpiece and configuring at least one system parameter of the mailpiece creation system in accordance with at least one of the fold configuration, adhesive tab dimension, target location and sheet material dimension.

3. The method according to claim 1 wherein the step of determining at least one dimension of the adhesive tab includes the steps of sensing the spacing between sequential adhesive tabs and determining the dimension of the adhesive tab based upon the spacing between sequential adhesive tabs.

4. The method according to claim 2 wherein the step of determining a target location includes the steps of:
determining the location of a free edge of the folded sheet material based upon the fold configuration;
selecting one of a surface tabbing operation and an edge tabbing operation based upon the fold configuration;
determining whether dimensional limitations in connection with the dimension of the adhesive tab prohibit the placement of an adhesive tab at various locations along the free edge of the folded sheet material; and
providing a visual cue to an operator of the mailpiece creation system regarding at least one candidate target location.

5. The method according to claim 4 wherein the step of determining a target location includes the further step of:
choosing, via an input display device, one of steps of:
accepting the candidate target location as the target location, and
rejecting the candidate target location to change the target location.

6. The method according to claim 1 wherein the step of determining a fold configuration includes the further steps of:
associating the mail run job with a previously serviced customer;
accessing historical data concerning customer preferences in connection with mailpiece creation; and
selecting a fold configuration based upon the customer preferences.

7. The method according to claim 1 wherein the step of configuring at least one system parameter includes the step of:
configuring a system parameter from the group of a: diverter, inverter, mailpiece conveyance speed, and feedback sensing system.

8. An integrated system to configure a mailpiece creation system in accordance with a plurality of system parameters, comprising
folding station operative to fold sheet material producing a fold configuration having a free edge;
a tabbing apparatus operative to receive folded sheet material from the folding station, dispense adhesive tabs across the free edge, and secure the folded sheet material;
a feedback sensing system operative to sense the spacing between sequential adhesive tabs of a tab stock and determine the adhesive tab dimension based upon the spacing between sequential adhesive tabs;
a user interface operative to receive input data regarding one of the fold configuration, an adhesive tab dimension, and a target location for dispensing an adhesive tab; and
a controller, responsive to the input data, for configuring at least one system parameter of the mailpiece creation system in accordance with one of the fold configuration, adhesive tab dimension, and target location, to process a mail run job for folding and securing sheet material.

9. The integrated system according to claim 8 further comprising a feedback sensing system operative to the leading and trailing edge locations of an adhesive tab and determining the adhesive tab dimension based upon the leading and trailing edge locations.

10. The integrated system according to claim 8 wherein the controller is operative to determine the location of the free edge of the folded sheet material based upon the fold configuration, select one of a surface tabbing operation and an edge tabbing operation based upon the fold configuration, and determine whether dimensional limitations prohibit the placement of an adhesive tab at various locations along the free edge of the folded sheet material.

11. The integrated system according to claim 10 wherein the user interface provides a visual cue to an operator regarding the position of at least one candidate target location.

12. The integrated system according to claim 8 further comprising a memory storage device for maintaining historical data concerning previously-serviced customer preferences in connection with mailpiece creation; and wherein the controller is operative to associate the mail run job with a previously serviced customer and select a select a fold configuration based upon the historical data of customer preferences.

13. The integrated system according to claim 8 wherein the system parameter controls one from the group of: a: diverter, an inverter, a stepper motor for driving a conveyor deck, and the feedback sensing system.

* * * * *